United States Patent
Chun

(10) Patent No.: US 10,031,659 B2
(45) Date of Patent: Jul. 24, 2018

(54) MOBILE TERMINAL AND METHOD FOR GESTURE INPUT CONTROLLING AN INDIVIDUAL APPLICATION SETTING

(71) Applicant: LG ELECTRONICS INC., Seoul (KR)

(72) Inventor: Woochang Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 553 days.

(21) Appl. No.: 14/285,796

(22) Filed: May 23, 2014

(65) Prior Publication Data
US 2015/0052466 A1 Feb. 19, 2015

(30) Foreign Application Priority Data
Aug. 16, 2013 (KR) .......................... 10-2013-0097075

(51) Int. Cl.
| | | |
|---|---|---|
| *G06F 3/0481* | (2013.01) | |
| *G06F 3/0486* | (2013.01) | |
| *G06F 3/0484* | (2013.01) | |
| *G06F 3/0488* | (2013.01) | |
| *G06F 9/451* | (2018.01) | |

(Continued)

(52) U.S. Cl.
CPC .......... *G06F 3/0486* (2013.01); *G06F 3/0484* (2013.01); *G06F 3/0488* (2013.01); *G06F 3/04817* (2013.01); *G06F 9/4443* (2013.01); *G06F 9/44505* (2013.01); *G06F 9/451* (2018.02); *H04M 1/72563* (2013.01)

(58) Field of Classification Search
CPC .. G06F 9/44505; G06F 9/4443; G06F 3/0484; G06F 3/0486; G06F 3/04817; G06F 3/0488; G06F 3/04812; H04M 1/72563
See application file for complete search history.

(56) References Cited

U.S. PATENT DOCUMENTS 7,346,894 B1 * 3/2008 Cook .................. G06F 9/44505
715/788
7,665,064 B2 * 2/2010 Able ................. G06F 17/30861
717/117

(Continued)

FOREIGN PATENT DOCUMENTS

| CN | 102915202 A | 2/2013 |
|---|---|---|
| CN | 103139371 A | 6/2013 |
| CN | 103179266 A | 6/2013 |

*Primary Examiner* — Steven Sax
(74) *Attorney, Agent, or Firm* — Birch, Stewart, Kolasch & Birch, LLP

(57) ABSTRACT

A mobile terminal and controlling method thereof are disclosed, which facilitates a terminal to be used in further consideration of user's convenience. The present invention includes a touchscreen and a controller controlling a system setting based on a user's system setting input, the controller, if receiving an application individual setting input corresponding to a prescribed application, controlling the application individual setting to be applied in case of activation of the prescribed application only. Accordingly, a setting for an overall system and a setting for an individual application are performed discriminately, whereby a convenience enhanced user environment can be provided. And, in performing a setting for an overall system and a setting for an individual application discriminately, a user interface (UI) for facilitating the settings can be provided.

4 Claims, 22 Drawing Sheets

(51) Int. Cl.
*G06F 9/44* (2018.01)
*G06F 9/445* (2018.01)
*H04M 1/725* (2006.01)

(56) References Cited

U.S. PATENT DOCUMENTS

| | | | | |
|---|---|---|---|---|
| 8,890,805 B2* | 11/2014 | Kwon | ............... | H04M 1/72583 |
| | | | | 345/156 |
| 9,423,878 B2* | 8/2016 | Lessing | ................... | G06F 3/017 |
| 2002/0152255 A1* | 10/2002 | Smith, Jr. | ............. | G06F 9/4443 |
| | | | | 718/102 |
| 2004/0049743 A1* | 3/2004 | Bogward | ................ | G06F 1/162 |
| | | | | 715/262 |
| 2004/0109013 A1* | 6/2004 | Goertz | ................. | G06F 3/0481 |
| | | | | 715/702 |
| 2005/0243093 A1* | 11/2005 | Macauley | ............... | A63F 13/06 |
| | | | | 345/501 |
| 2006/0147891 A1* | 7/2006 | Dreyfous | ................ | G09B 5/00 |
| | | | | 434/362 |
| 2006/0200769 A1* | 9/2006 | Chevallier | ......... | G06F 3/04815 |
| | | | | 715/727 |
| 2007/0300260 A1* | 12/2007 | Holm | ................... | H04N 5/4401 |
| | | | | 725/47 |
| 2008/0076977 A1* | 3/2008 | Mannheimer | ...... | A61B 5/02405 |
| | | | | 600/301 |
| 2010/0138759 A1* | 6/2010 | Roy | ...................... | G06F 9/4443 |
| | | | | 715/764 |
| 2010/0257196 A1* | 10/2010 | Waters | .................. | G06F 9/4443 |
| | | | | 707/769 |
| 2011/0075635 A1* | 3/2011 | Ryu | ...................... | H04W 36/14 |
| | | | | 370/332 |
| 2011/0105193 A1* | 5/2011 | Lee | ........................ | G06F 3/0488 |
| | | | | 455/566 |
| 2012/0066602 A1* | 3/2012 | Chai | ................... | G06F 3/04817 |
| | | | | 715/733 |
| 2012/0159139 A1* | 6/2012 | Kim | ................... | H04M 1/72563 |
| | | | | 713/2 |
| 2012/0290977 A1* | 11/2012 | Devecka | ................ | H04W 4/21 |
| | | | | 715/810 |
| 2013/0082935 A1* | 4/2013 | Duggan | ............... | G06F 3/04886 |
| | | | | 345/172 |
| 2013/0139109 A1 | 5/2013 | Kim et al. | | |
| 2013/0157722 A1 | 6/2013 | Kim et al. | | |
| 2013/0205210 A1* | 8/2013 | Jeon | ..................... | G06F 3/04883 |
| | | | | 715/716 |
| 2013/0339909 A1* | 12/2013 | Ha | .......................... | G06F 3/017 |
| | | | | 715/863 |
| 2014/0122212 A1* | 5/2014 | Shugart | ............... | G06Q 30/0231 |
| | | | | 705/14.31 |
| 2014/0298213 A1* | 10/2014 | Huang | ................ | G06F 3/04817 |
| | | | | 715/762 |

* cited by examiner

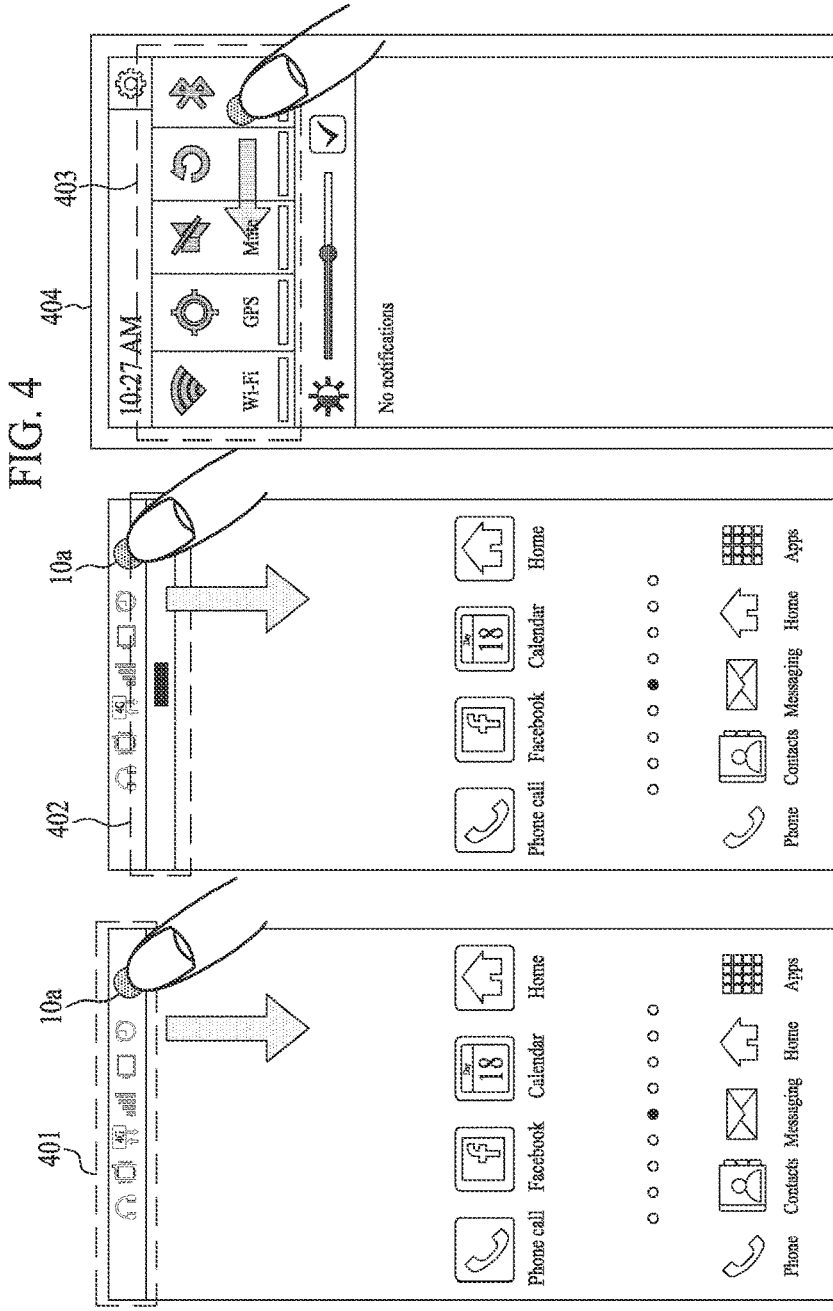

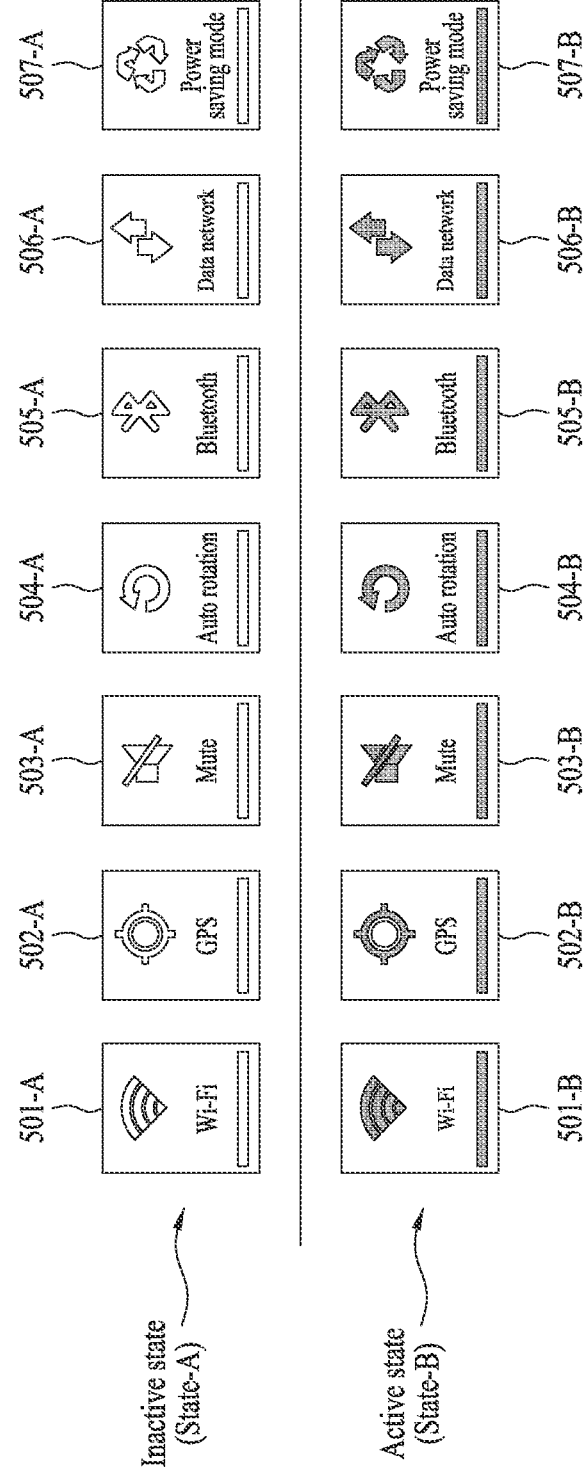

FIG. 16

| | | | | | | |
|---|---|---|---|---|---|---|
| 10:27 AM Thursday, July 18, 2013 | | | | | | ⚙ |
| 1601 — Common setting | on / off | Wi-Fi | GPS | Mute | Auto rotation | Bluetooth |
| 1602 — Internet | on / off | Wi-Fi | GPS | Mute | Auto rotation | Bluetooth |
| 1603 — Messaging | on / off | Wi-Fi | GPS | Mute | Auto rotation | Bluetooth |
| 1604 — Phone | on / off | Wi-Fi | GPS | Mute | Auto rotation | Bluetooth |
| 1605 — Contacts | on / off | Wi-Fi | GPS | Mute | Auto rotation | Bluetooth |
| 1606 — Facebook | on / off | Wi-Fi | GPS | Mute | Auto rotation | Bluetooth |
| 1607 — Naver | on / off | Wi-Fi | GPS | Mute | Auto rotation | Bluetooth |
| 1608 — Kakao Talk | on / off | Wi-Fi | GPS | Mute | Auto rotation | Bluetooth |
| 18 | on / off | | | | | |
| SKTelecom | | | | | | |

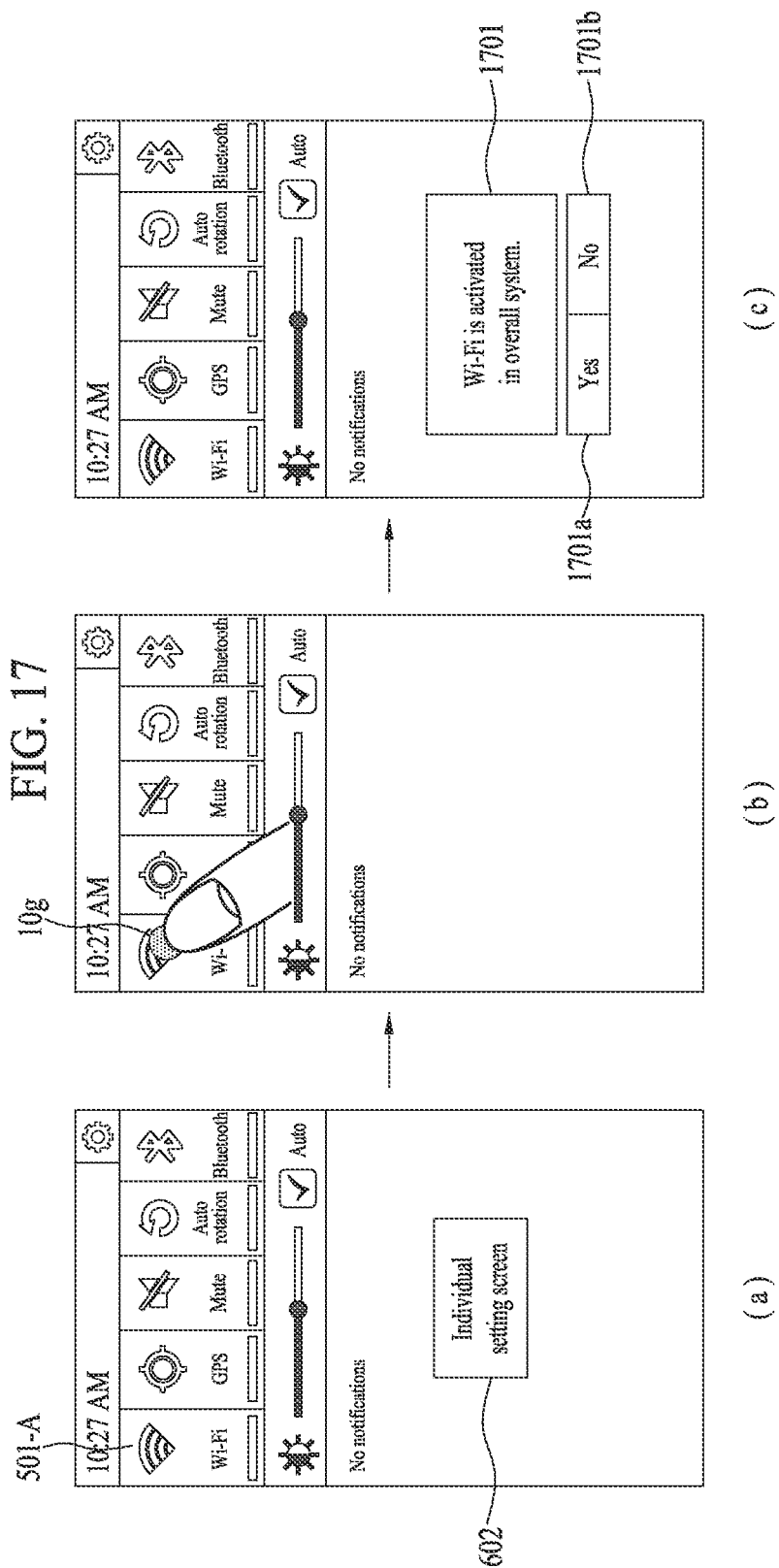

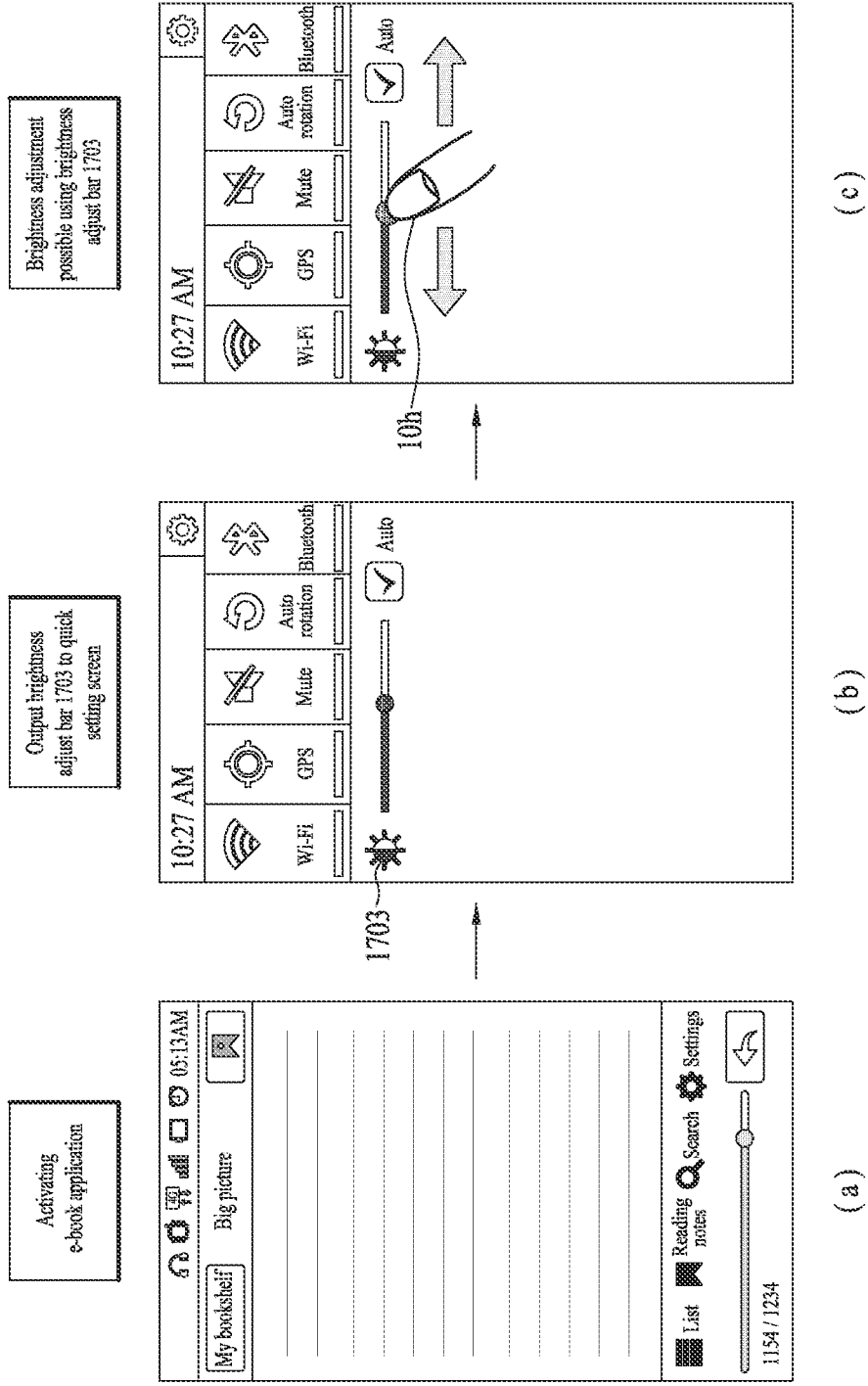

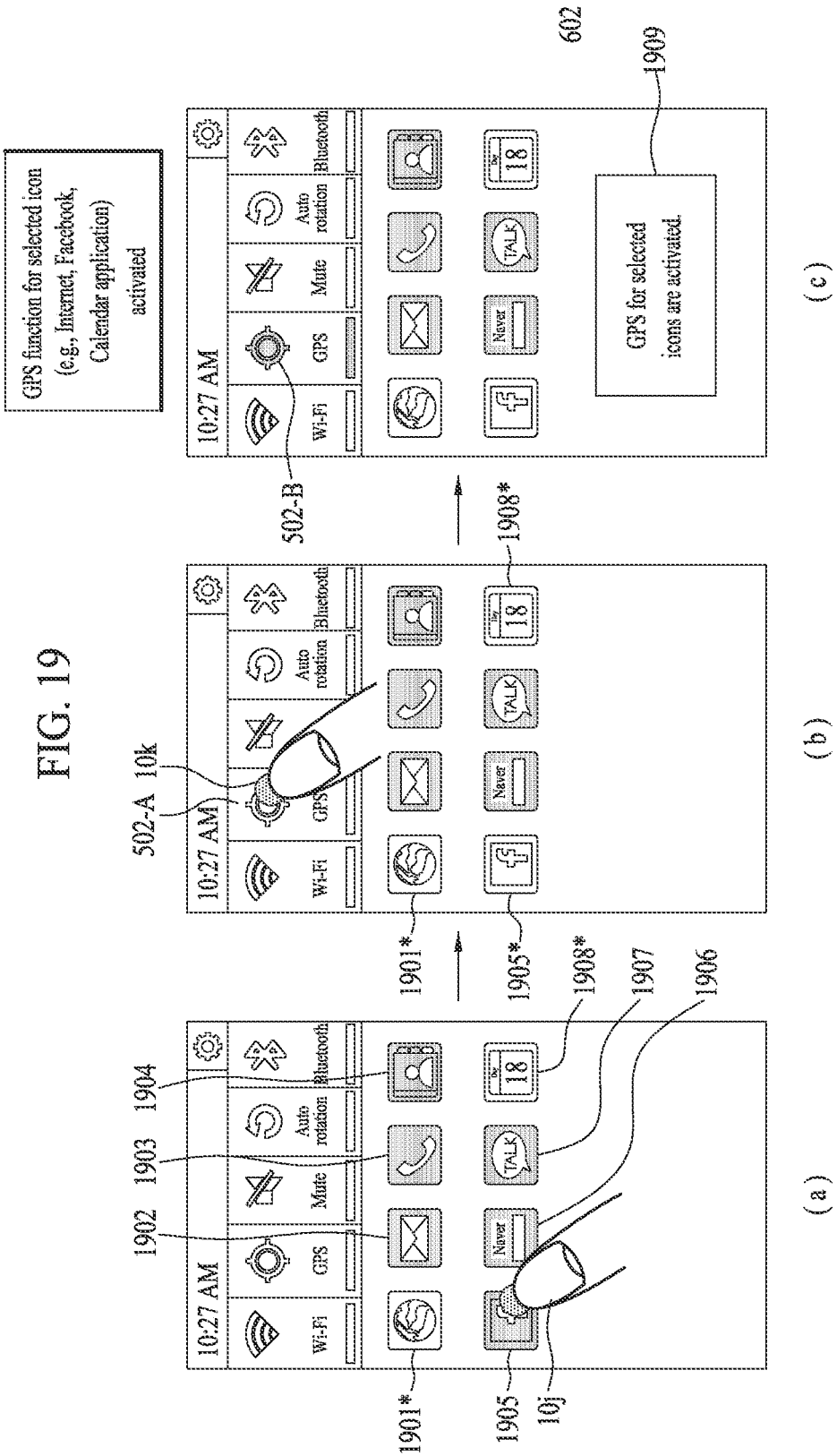

MOBILE TERMINAL AND METHOD FOR GESTURE INPUT CONTROLLING AN INDIVIDUAL APPLICATION SETTING

Pursuant to 35 U.S.C. § 119(a), this application claims the benefit of earlier filing date and right of priority to Korean Application No. 10-2013-0097075 filed on Aug. 16, 2013, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for facilitating a terminal to be used in further consideration of user's convenience.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, as mobile terminals tend to be increasingly used, development of software for a smartphone corresponding to a representative type of a mobile terminal has been in the spotlight. Software is provided as a so-called application. Software types and software applied fields have been diversified as well.

In controlling the settings of a mobile terminal, it may be necessary to apply the diversified types of applications effectively. In particular, the demand for a mobile terminal controlling method for effectively controlling the settings for an individual application as well as the settings for an overall system of a mobile terminal is rising.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which the settings for an overall system and the settings for an individual system can be discriminated from each other.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to the present invention may include a touchscreen and a controller controlling a system setting based on a user's system setting input, the controller, if receiving an application individual setting input corresponding to a prescribed application, controlling the application individual setting to be applied in case of activation of the prescribed application only.

In another aspect of the present invention, as embodied and broadly described herein, a method of controlling a mobile terminal according to the present invention may include the steps of controlling a system setting based on a user's system setting input and if receiving an application individual setting input corresponding to a prescribed application, controlling the application individual setting to be applied in case of activation of the prescribed application only.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 4 is a diagram for one example of a method of outputting a setting screen to a touchscreen according to one embodiment of the present invention;

FIG. 5 is a diagram for one example of setting icon types according to one embodiment of the present invention;

FIG. 16 is a diagram for one example of a method of outputting a setting icon discriminately to discriminate a common setting and an individual setting from each other according to one embodiment of the present invention;

FIG. 17 is a diagram for one example of an operating method by combining two kinds of controlling methods according to one embodiment of the present invention;

FIG. 18A and FIG. 18B are diagrams for one example of a method of changing a setting screen depending on a type (or property) of an active application according to one embodiment of the present invention;

FIG. 19 is a diagram for one example of a method of controlling individual settings for a plurality of applications according to one embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile terminals, such as mobile phones, user equipment, smart phones, mobile computers, digital broadcast terminals, personal digital assistants, portable multimedia players (PMP) and navigators.

Figure 1:
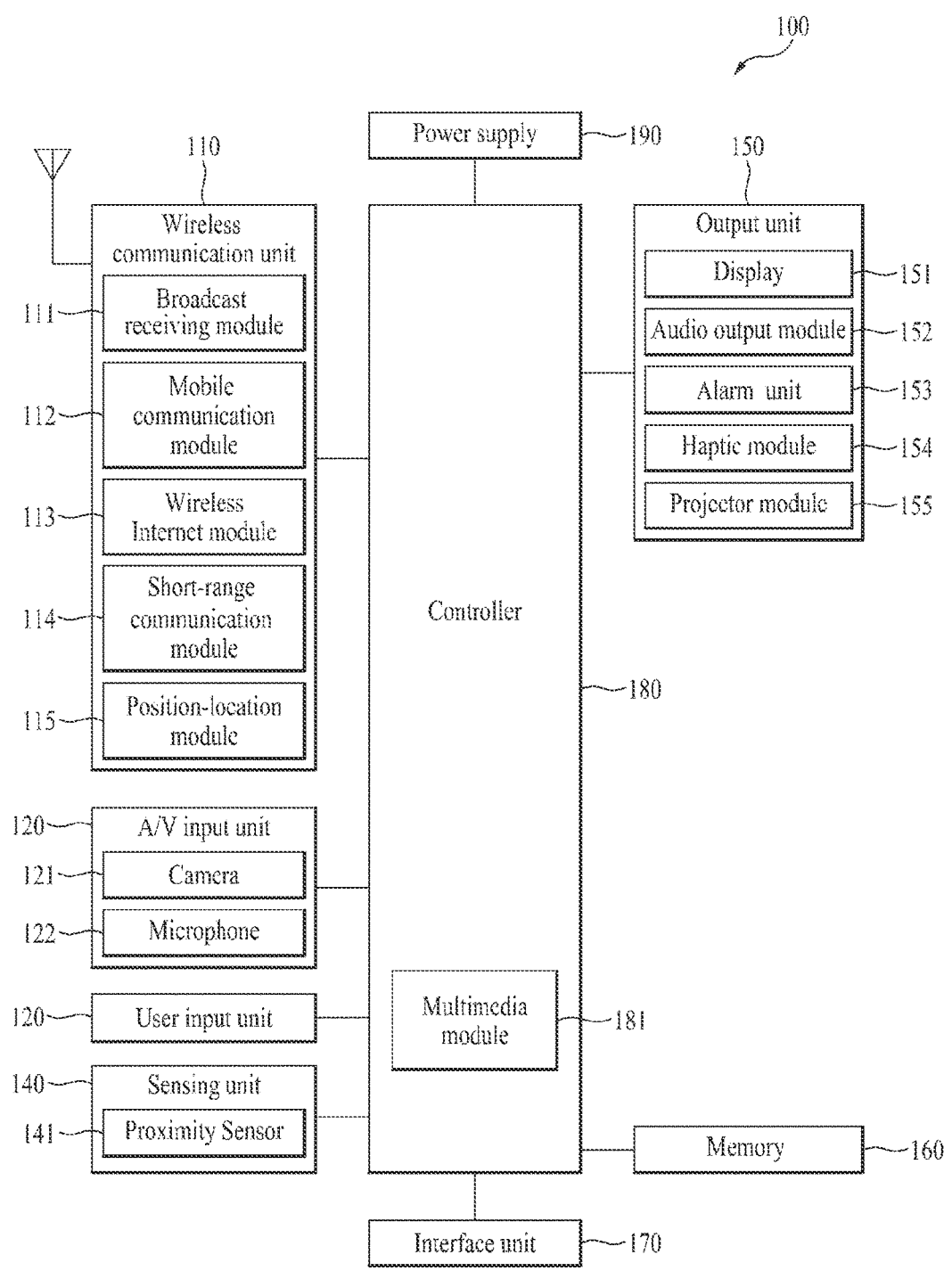
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless Internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100, and free-falling of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
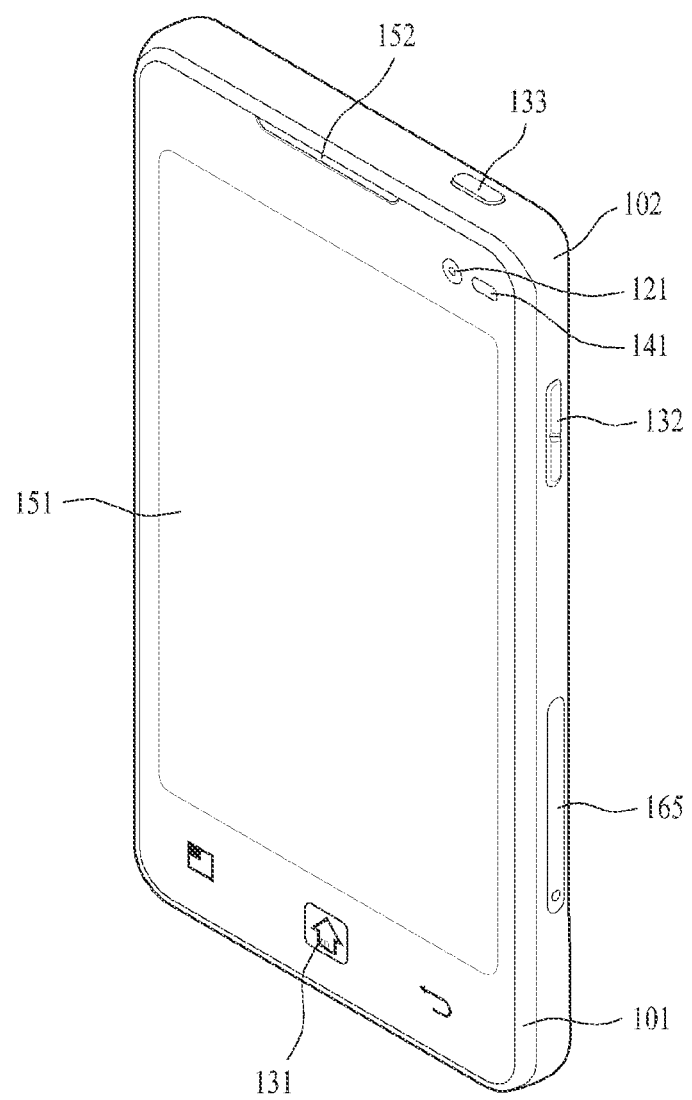
FIG. 2 is a front perspective diagram for one example of a mobile or portable terminal according to the present invention.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 3A:
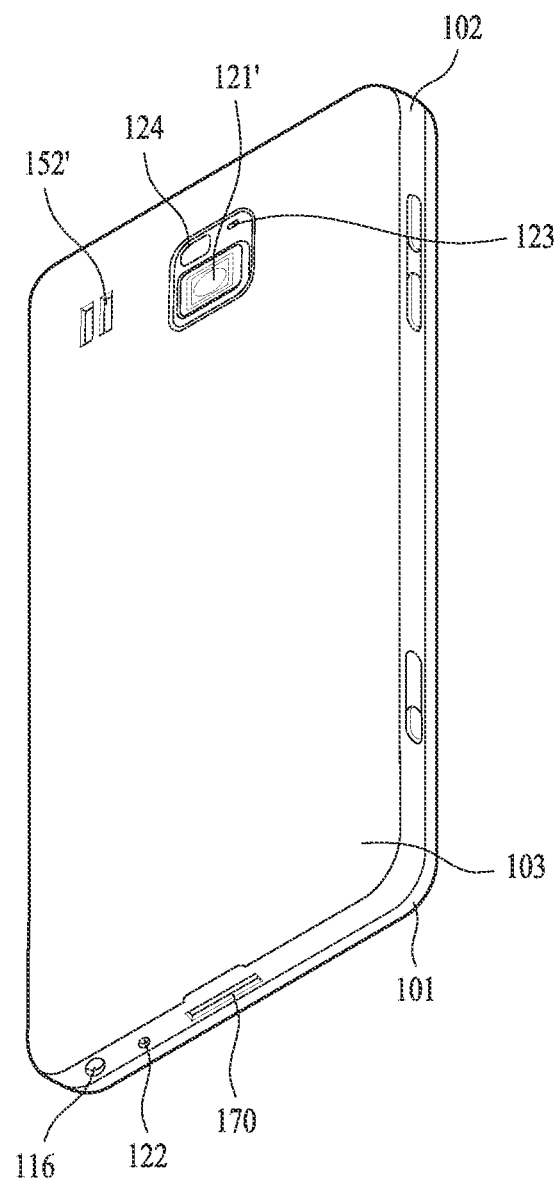
FIG. 3A is a rear perspective diagram of the mobile terminal shown in FIG. 2.

FIG. 3a is a perspective diagram of a backside of the terminal shown in FIG. 2.

Referring to FIG. 3a, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2 and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

Figure 3B:
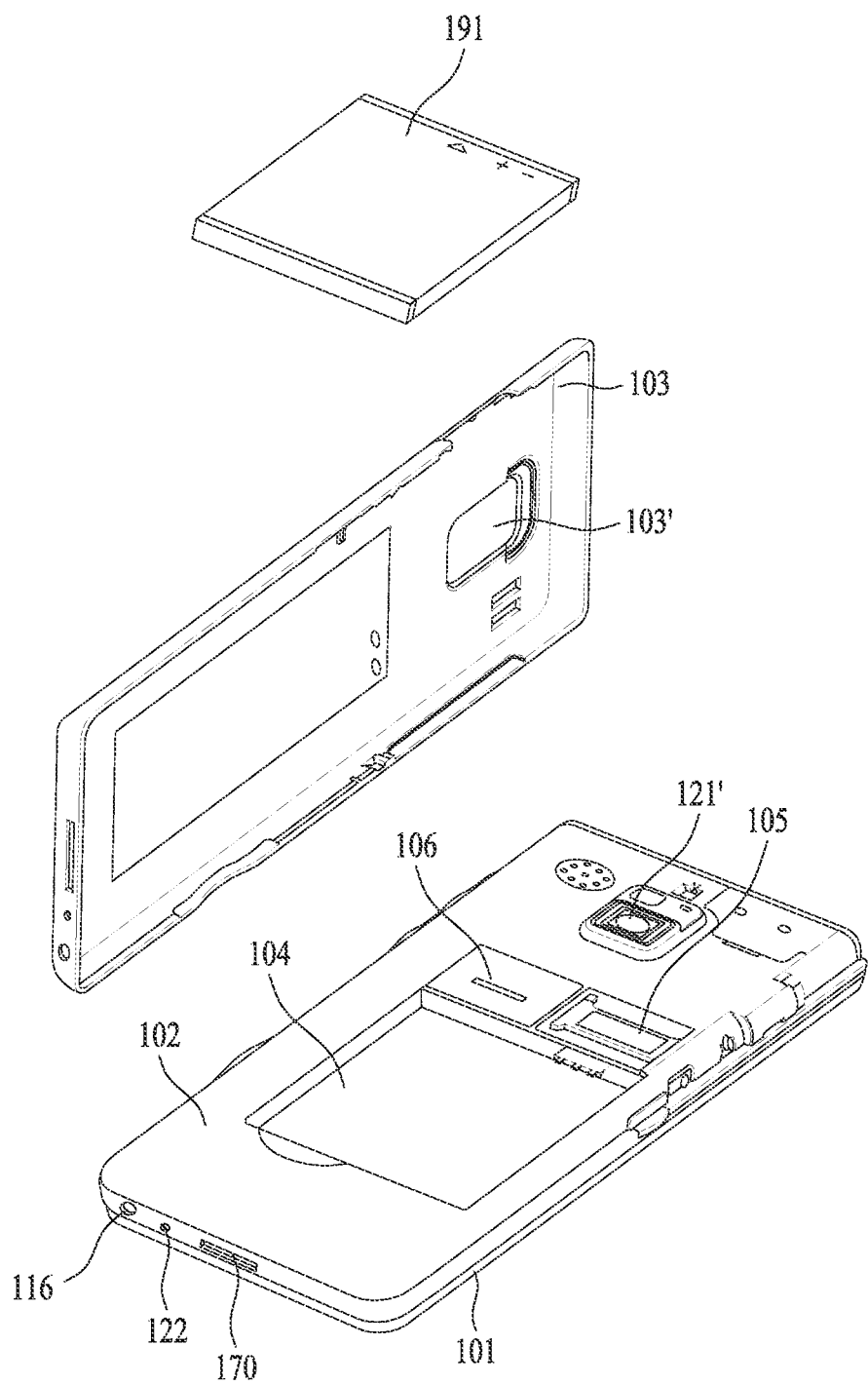
FIG. 3B is a rear perspective diagram of a surface of a rear case exposed by separating a rear cover of a mobile terminal according to one embodiment of the present invention.

FIG. 3B is a rear perspective diagram of a surface of a rear case exposed by separating a rear cover of a mobile terminal according to one embodiment of the present invention.

Referring to FIG. 3B, a front case 101, a rear case 102, a rear cover (or a battery cover) 103, a camera 121', an interface unit 170, a microphone 122, a speaker module 154, an audio output unit 152', a battery 191, a battery loading unit 104, a USIM card loading unit 166, and a memory card loading unit 167 are provided.

A space for mounting such an external part as the battery loading unit 104, the USIM card loading unit 105, the memory card loading unit 106 and the like can be provided to a surface of the rear case 102. Generally, the external part loaded on the surface of the rear case 102 is provided to extend functions of the mobile terminal 100 in order to meet the diversified functions of the mobile terminal and a variety of the consumer's needs.

As the performance of the mobile terminal gets diverse, the battery 191 can be configured as a replaceable type, as shown in FIG. 3B, to complement a considerable amount of power consumption. In case that the replaceable type is adopted, the battery loading unit 104 is formed on the surface of the rear case 102 to enable a user to detach the corresponding battery. In this case, a contact terminal is provided to the battery loading unit 104 to be electrically connected to a part installed within the case.

The USIM card loading unit 166 or the memory card loading unit 167 may be provided, as shown in FIG. 3B, next to the battery loading unit 104. Alternatively, the USIM card loading unit 166 or the memory card loading unit 167 may be provided to a bottom surface of the battery loading unit 104. Hence, the battery 191 can be externally exposed if the battery 191 is unloaded from the battery loading unit 104. In this case, since a size of the battery loading unit 104 is extensible, the battery 191 can be oversized.

Although FIG. 3B shows the configuration that the USIM card loading unit 166 or the memory card loading unit 167 is mounted on a backside of the rear case 102, it can be inserted in or separated from the mobile terminal 100 in a manner of being inserted in a lateral side of the rear case 102.

The rear cover 103 covers the surface of the rear case 102. Hence, the rear cover 103 can fix the battery, 191, the USIM card, the memory card and the lime not to be separated from the rear case 102 and also protects the external parts from external shocks or particles. Recently, a waterproof function is added to the mobile terminal 100. In order to prevent the external parts from contacting with water, the mobile terminal 100 can further include a waterproof structure (not shown in the drawing). Hence, when rear case 102 and the rear cover 103 are connected to each other, the waterproof structure can seal up the gap between the rear case 102 and the rear cover 103.

In the following description, controlling methods, which can be implemented in the above-configured mobile terminal, according to embodiments of the present invention are explained with reference to the accompanying drawings.

FIG. 4 is a diagram for one example of a method of outputting a setting screen to the touchscreen 151 according to one embodiment of the present invention.

According to one embodiment of the present invention, a setting screen manes a screen provided to a user to control various settings of a system required for managing and operating the mobile terminal 100. In particular, a user activates (enable) or deactivate (disable) various functions of the mobile terminal 100, inputs a prescribed setting value, and/or increases or decreases a prescribed setting value, through the outputted setting screen. A setting menu shall be described in detail with reference to FIG. 5 later.

In the drawings provided to describe embodiments of the present invention, for clarity and convenience, an exterior shape of the mobile terminal 100 is omitted but diagrams of statuses outputted through the touchscreen 151 may be illustrated only.

Referring to FIG. 4 (a), the controller 180 currently outputs a home screen and an indicator region 401 to the touchscreen 151.

The home screen is described in short as follows.

First of all, the home screen may be defined as a screen initially displayed on the touchscreen 151 if a locked state of the touchscreen 151 is cancelled (i.e., unlocked). And, at least one icon or widget for activating or enabling an application or an internal function may be displayed on the home screen. At least two home screens can exist in the mobile terminal 100. In this case, if a prescribed touch gesture is applied to the touchscreen 151, the at least two home screens can be sequentially displayed one by one. And, different icons (or widgets) may be displayed on each of the at least two home screens.

The indicator region 401 means a region for performing a function of indicating various operation statuses (e.g., a current hour, a battery level, a radio signal reception strength, etc.) of the mobile terminal as prescribed forms in a manner of being always displayed on the predetermined region 401 of the touchscreen 151, as shown in FIG. 4 (a), except a case that a prescribed application using a full screen of the touchscreen 151 is displayed.

According to one embodiment of the present invention, if a prescribed touch gesture is inputted to the indicator region 401, the controller 180 can control a setting screen 404 to be outputted to the touchscreen 151.

For instance, if the controller 180 receives a touch input 10a applied to the indicator region 401 [FIG. 4 (a)], the controller 180 may be able to output a setting bar 402 for spreading the setting screen 404 [FIG. 4 (b)]. If the controller 180 receives a drag input applied in a bottom direction by maintaining the touch of the touch input 10a, the controller 180 may control the setting screen 404 to be outputted [FIG. 4 (c)].

At least one setting icon for activating/deactivating a prescribed function of the mobile terminal 100 can be outputted from a region 403 on the setting screen 404. In doing so, referring to FIG. 4 (c) and FIG. 4 (d), the at least one setting icon may be outputted in a manner of being scrollable in right and left directions in response to a user's scroll input. Various species of the at least one setting icon are described in detail with reference to FIG. 5 as follows.

FIG. 5 is a diagram for one example of setting icon types according to one embodiment of the present invention.

Referring to FIG. 5, according to one embodiment of the present invention, setting icons can be differently displayed (e.g., icons in different colors, indicators indicating activation/deactivation, etc.) depending on an active status (represented as a status-A indicated by one of reference numbers 501A to 507-A in the drawing) or an inactive status (represented as a status-B indicated by one of reference numbers 501B to 507-B in the drawing). In the example shown in FIG. 5, activation of the setting icon and deactivation of the setting icon are discriminately represented by differentiating colors of the icons. The setting icons shown in FIG. 5 are described as Table 1 in the following.

may be necessary to set a video to be outputted by being rotated in case of activation of a video play application. For another instance, it may be necessary to set a Wi-Fi function to be activated only if a file download function is activated. For further instance, it may be necessary to activate a GPS module only if a map application is activated.

Therefore, according to one embodiment of the present invention, in order to meet the above-described necessity, it is intended to provide a setting screen for the settings per prescribed application. In order to provide such a setting screen, three kinds of methods according to one embodiment of the present invention are proposed as follows.

Method of outputting a common setting screen or an individual setting screen discriminately Method of discriminating setting screens using touch gestures Method of outputting setting icons discriminately from a setting screen In the following description, embodiments of the present invention are explained by the above-mentioned methods, respectively.

(1) Method of Outputting a Common Setting Screen or an Individual Setting Screen Discriminately FIGS. 6 to 10 are diagrams for examples of a method of outputting a common setting screen or an individual setting screen discriminately according to one embodiment of the present invention. According to the embodiments shown in FIGS. 6 to 10, it is proposed that a common setting screen or an individual setting screen is outputted discriminately using a touch gesture. In this case, the common setting

TABLE 1

| Titles of setting icons | Reference numbers in FIG. 5 | Activation/Deactivation | Notes |
| --- | --- | --- | --- |
| Wi-Fi setting icon | 501-A 501-B | Power on/off of Wi-Fi module | |
| GPS(Global Positioning System) setting icon | 502-A 502-B | Power on/off of GPS module | |
| Sound setting icon | 503-A 503-B | On/Off of audio output module | Vibration mode of outputting vibration changed from audio output is available as well as on/off of audio output module |
| Auto-rotation setting icon | 504-A 504-B | On/Off of auto-rotation function | Function of rotating and outputting an outputted screen depending on landscape/portrait mode of touchscreen in use |
| Bluetooth setting icon | 505-A 505-B | On/Off of Bluetooth module | |
| Data network setting icon | 506-A 506-B | Enable/Disable data communication | |
| Power saving mode setting icon | 507-A 507-B | On/Off of power saving function | Power saving function means a function of minimizing power consumption by cutting off a power of a specific module or restricting a prescribed function. |

Meanwhile, the setting icons described with reference to FIG. 5 and Table 1 are just exemplary. And, it is apparent to those skilled in the art that the present invention is applicable to other setting icons as well as to the above-described setting icons.

By manipulating the setting screen 404 shown in FIG. 4 and the setting icons shown in FIG. 5, a user can control the setting s for an overall system. Yet, in some cases, there may be a setting necessary for an activation of a specific application only. For instance, when the mobile terminal 100 is used normally, an auto-rotation function is not used. Yet, it screen means a system setting screen for controlling the settings for an overall system of the mobile terminal 100. And, the individual setting screen means a setting screen for applying settings only in case of activation of a prescribed application. Regarding setting operations respectively corresponding to the above-mentioned setting screens, an operation of performing the settings for the overall system of the mobile terminal 100 shall be named a common setting, while an operation of performing the settings for an individual application shall be named an individual setting.

In particular, if the controller 180 receives a $1^{st}$ touch gesture through the touchscreen 151, the controller 180 can output a common setting screen in response to the $1^{st}$ touch gesture. If the controller 180 receives a $2^{nd}$ touch gesture through the touchscreen 151, the controller 180 can output an individual setting screen in response to the $2^{nd}$ touch gesture. Examples of the $1^{st}$ and $2^{nd}$ touch gestures are described in detail with reference to FIGS. 6 to 10 as follows.

Figure 6:
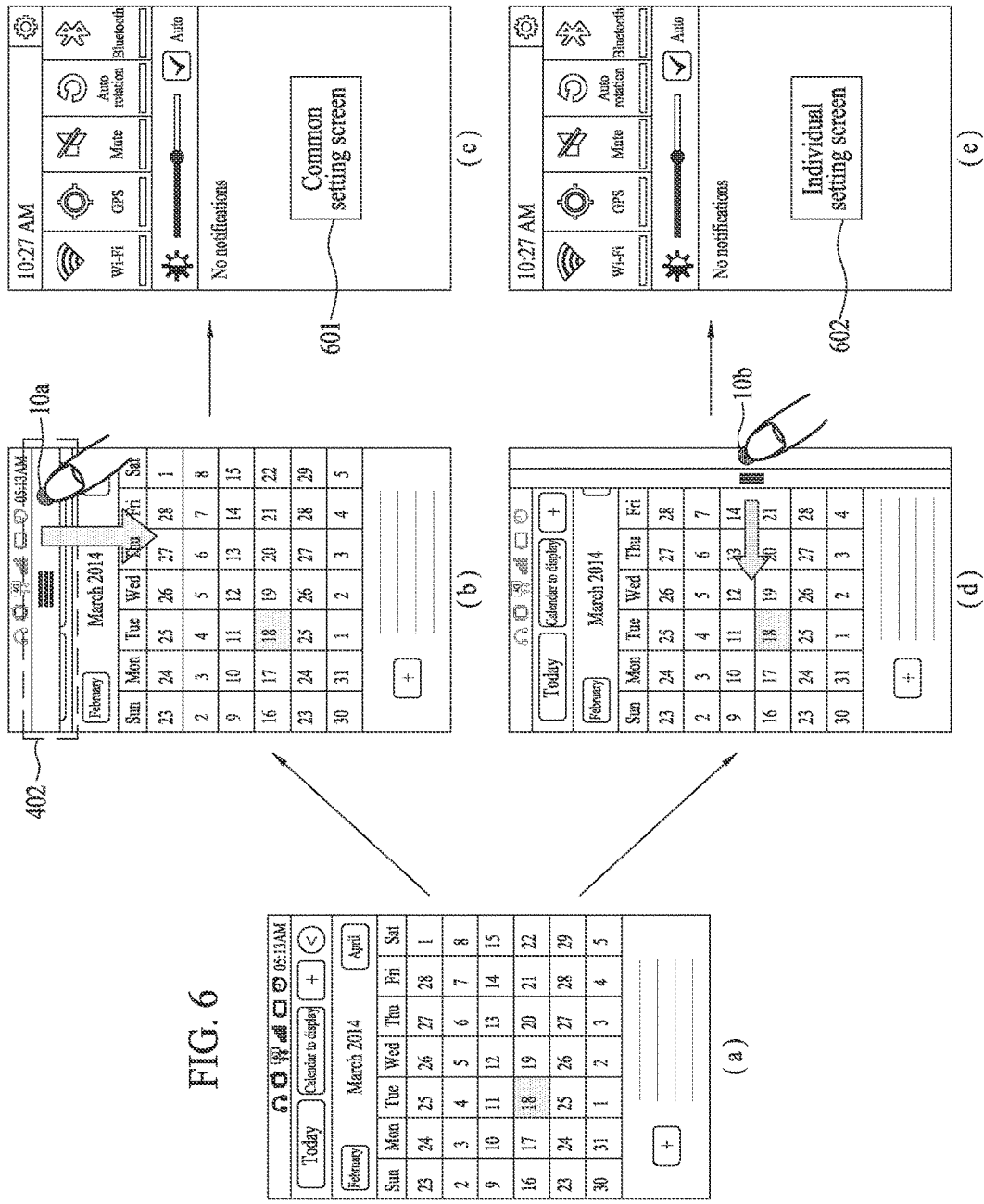
FIGS. 6 to 10 are diagrams for examples of a method of outputting a common setting screen or an individual setting screen discriminately according to one embodiment of the present invention.

Referring to FIG. 6 (*a*), the controller 180 currently outputs a screen of a prescribed application (e.g., a calendar application, etc.).

Referring to FIG. 6 (*b*) and FIG. 6 (*c*), if the controller 180 receives an input 10*a* (i.e., an input applied in a manner of touching a top edge of the touchscreen and then dragging in a bottom direction) applied in a manner of touching a $1^{st}$ side edge of the touchscreen and then dragging, the controller 180 can output a common setting screen. And, the controller 180 outputs a popup window 601 indicating the common setting screen to provide the guidance to a user.

Referring to FIG. 6 (*d*) and FIG. 6 (*e*), if the controller 180 receives an input 10*b* (i.e., an input applied in a manner of touching a right edge of the touchscreen and then dragging in a left direction) applied in a manner of touching a $2^{nd}$ side edge of the touchscreen and then dragging, the controller 180 can output an individual setting screen. And, the controller 180 outputs a popup window 602 indicating the individual setting screen to provide the guidance to a user.

Figure 7:
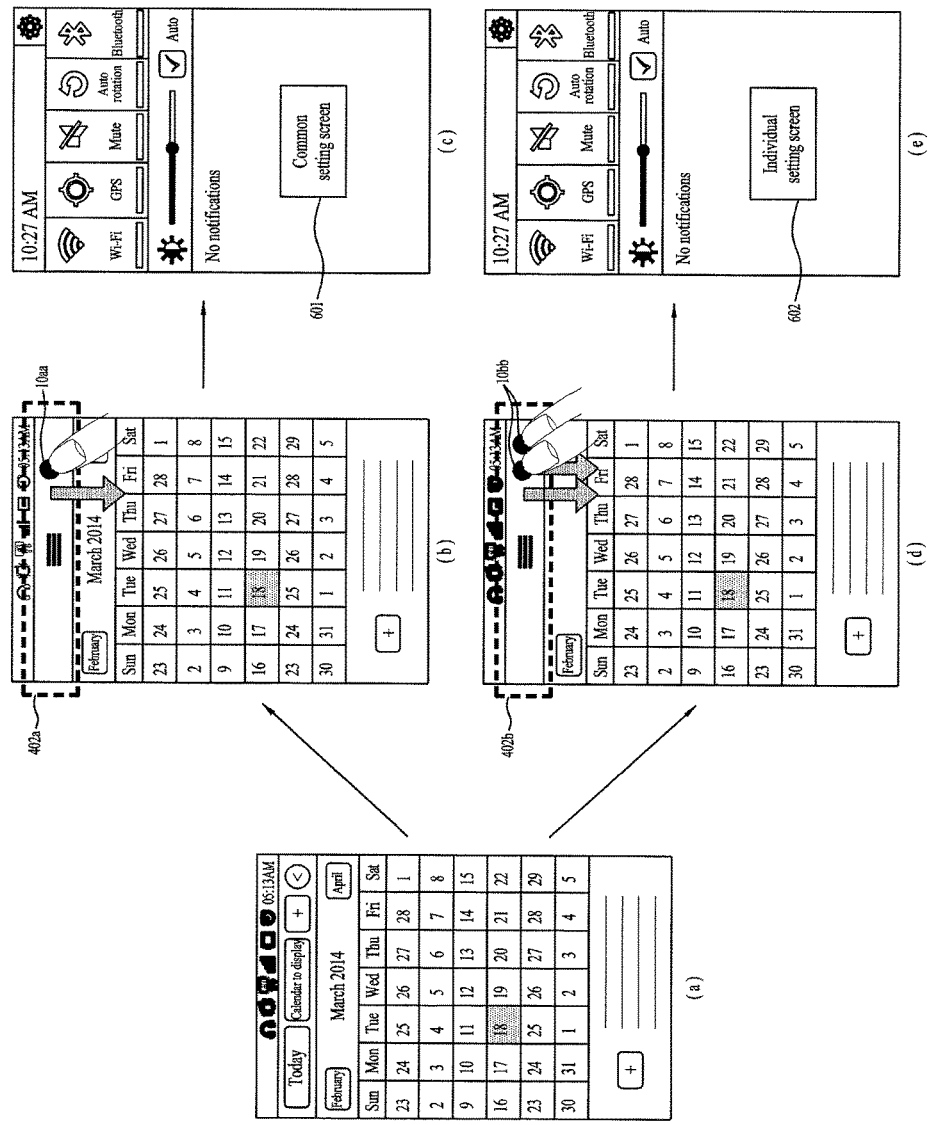

Referring to FIG. 7 (*a*), the controller 180 currently outputs a screen of a prescribed application (e.g., a calendar application, etc.).

Referring to FIG. 7 (*b*) and FIG. 7 (*c*), if the controller 180 receives an input 10*aa* (i.e., an input applied in a manner of touching a top edge of the touchscreen and then dragging in a bottom direction) applied in a manner of touching a $1^{st}$ side edge of the touchscreen with a single finger and then dragging, the controller 180 can output a common setting screen. And, the controller 180 outputs a popup window 601 indicating the common setting screen to provide the guidance to a user.

Referring to FIG. 7 (*d*) and FIG. 7 (*e*), if the controller 180 receives an input 10*bb* (i.e., an input applied in a manner of double touching the top edge of the touchscreen with two fingers and then dragging in the bottom direction) applied in a manner of touching the same $1^{st}$ side edge of the touchscreen and then dragging, the controller 180 can output an individual setting screen. And, the controller 180 outputs a popup window 602 indicating the individual setting screen to provide the guidance to a user.

In this case, the controller 180 output a setting bar 402 discriminately in order to enable the user to discriminate an output of the common setting screen and an output of the individual setting screen. For instance, referring to FIG. 7 (*b*), if the controller 180 receives the input 10*aa* of touching the top edge to output the common setting screen, the controller 180 can output a $1^{st}$ setting bar 402*a*. For another instance, referring to FIG. 7 (*d*), if the controller 180 receives the input 10*bb* of touching the top edge with two fingers to output the individual setting screen, the controller 180 can output a $2^{nd}$ setting bar 402*b*. Therefore, the controller 180 outputs the $1^{st}$ setting bar 402*a* or the $2^{nd}$ setting bar 402*b* discriminately, thereby enabling the user to identify whether the current output is the output of the common setting screen or the output of the individual setting screen.

Figure 8:
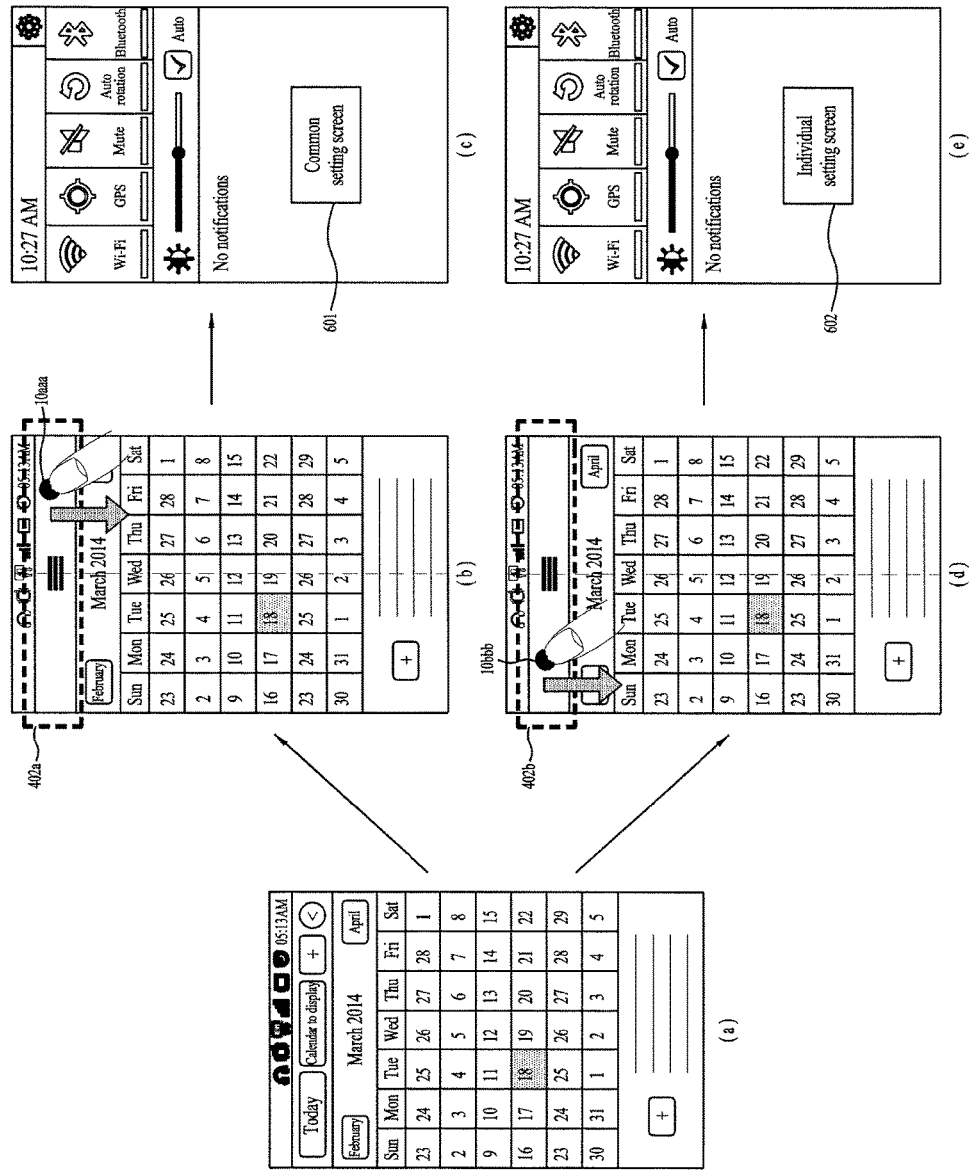

Referring to FIG. 8 (*a*), the controller 180 currently outputs a screen of a prescribed application (e.g., a calendar application, etc.).

Referring to FIG. 8 (*b*) and FIG. 8 (*c*), if the controller 180 receives an input 10*aaa* (i.e., an input applied in a manner of touching a top edge of a right region generated from partitioning the touchscreen into two regions and then dragging in a bottom direction) applied in a manner of touching a $1^{st}$ side edge of a $1^{st}$ region generated from partitioning the touchscreen into two parts and then dragging, the controller 180 can output a common setting screen. And, the controller 180 outputs a popup window 601 indicating the common setting screen to provide the guidance to a user.

Referring to FIG. 8 (*d*) and FIG. 8 (*e*), if the controller 180 receives an input 10*bbb* (i.e., an input applied in a manner of touching a top edge of a left region generated from partitioning the touchscreen into two regions and then dragging in a bottom direction) applied in a manner of touching a $1^{st}$ side edge of a $2^{nd}$ region generated from partitioning the touchscreen into two parts and then dragging, the controller 180 can output an individual setting screen. And, the controller 180 outputs a popup window 602 indicating the individual setting screen to provide the guidance to a user.

In this case shown in FIG. 8, like the case shown in FIG. 7, the controller 180 output a setting bar 402 discriminately in order to enable the user to discriminate an output of the common setting screen and an output of the individual setting screen. For instance, referring to FIG. 8 (*b*), if the controller 180 receives the input 10*aaa* of touching the right top edge of the touchscreen to output the common setting screen, the controller 180 can output a $1^{st}$ setting bar 402*a*. For another instance, referring to FIG. 8 (*d*), if the controller 180 receives the input 10*bbb* of touching the left top edge to output the individual setting screen, the controller 180 can output a $2^{nd}$ setting bar 402*b*.

So far, the methods of paging a common setting screen or an individual setting screen discriminately are described with reference to FIGS. 6 to 8. In the following description, a status diagram of a common setting screen and a status diagram of an individual setting screen are described in detail with reference to FIG. 9 and FIG. 10.

Figure 9:
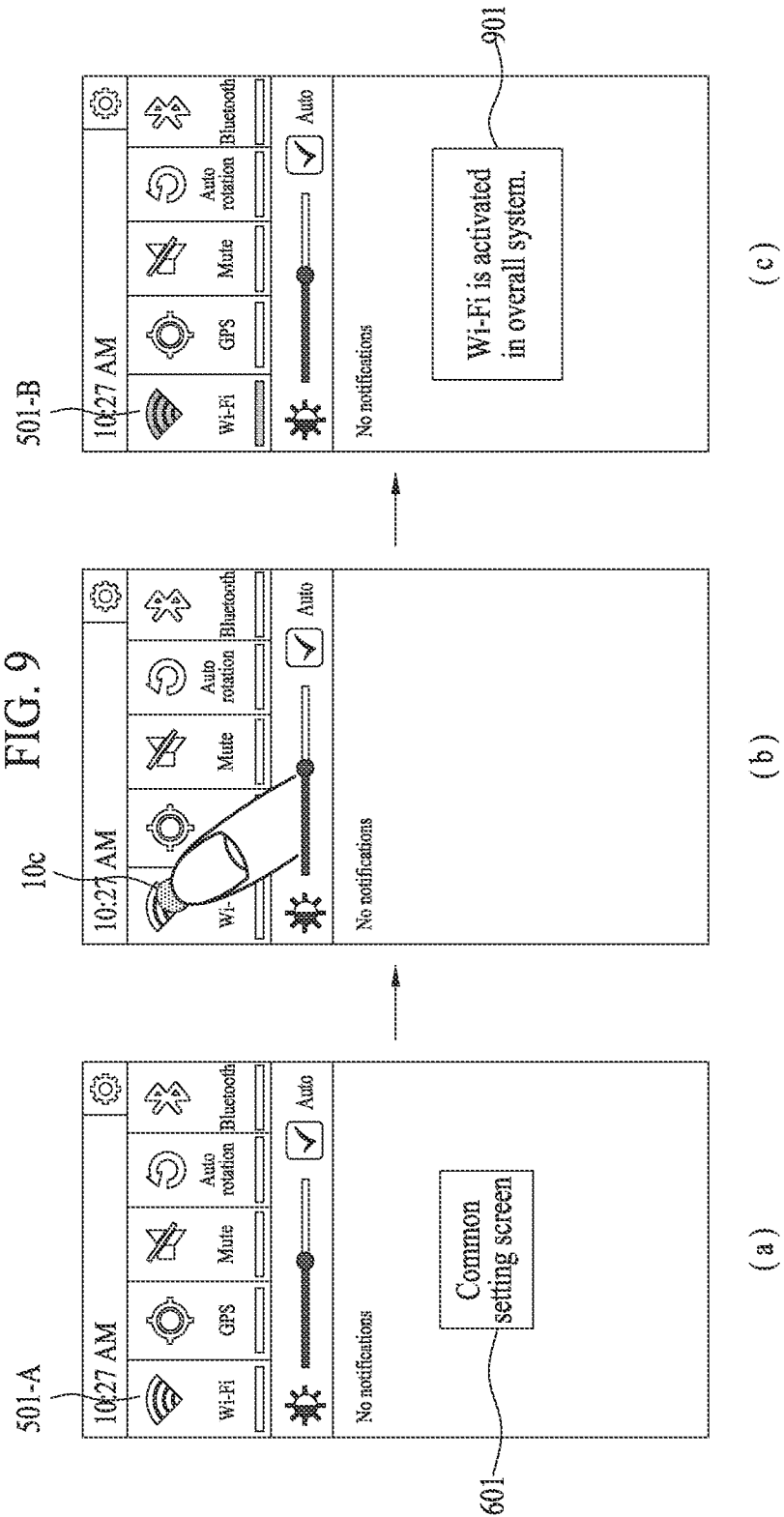

FIG. 9 is a diagram of a status of a common setting screen according to one embodiment of the present invention. In this case, the common setting screen can be paged by one of the common setting screen paging methods described with reference to FIGS. 6 to 8.

Referring to FIG. 9 (*a*), the controller 180 can output a popup window 601 indicating a common setting screen. And, at least one or more setting icons 501-A to 505-A) can be outputted from the common setting screen. In the example shown in FIG. 9 (*a*), the setting icons are currently inactive.

If a user intends to activate a Wi-Fi function in the settings of a system, the user can select the currently outputted setting icon 501-A. In particular, if the Wi-Fi setting icon 501-A in the inactive state is selected by an input 10*c* (i.e., a touch to the setting icon 501-A), the controller 180 can activate the Wi-Fi function [FIG. 9 (*b*)]. If so, referring to FIG. 9 (*c*), the controller 180 enables the inactive Wi-Fi setting icon 501-A to enter an active state 501-B and is also able to output a popup window 901 indicating that the Wi-Fi function is activated in the overall system.

Figure 10:
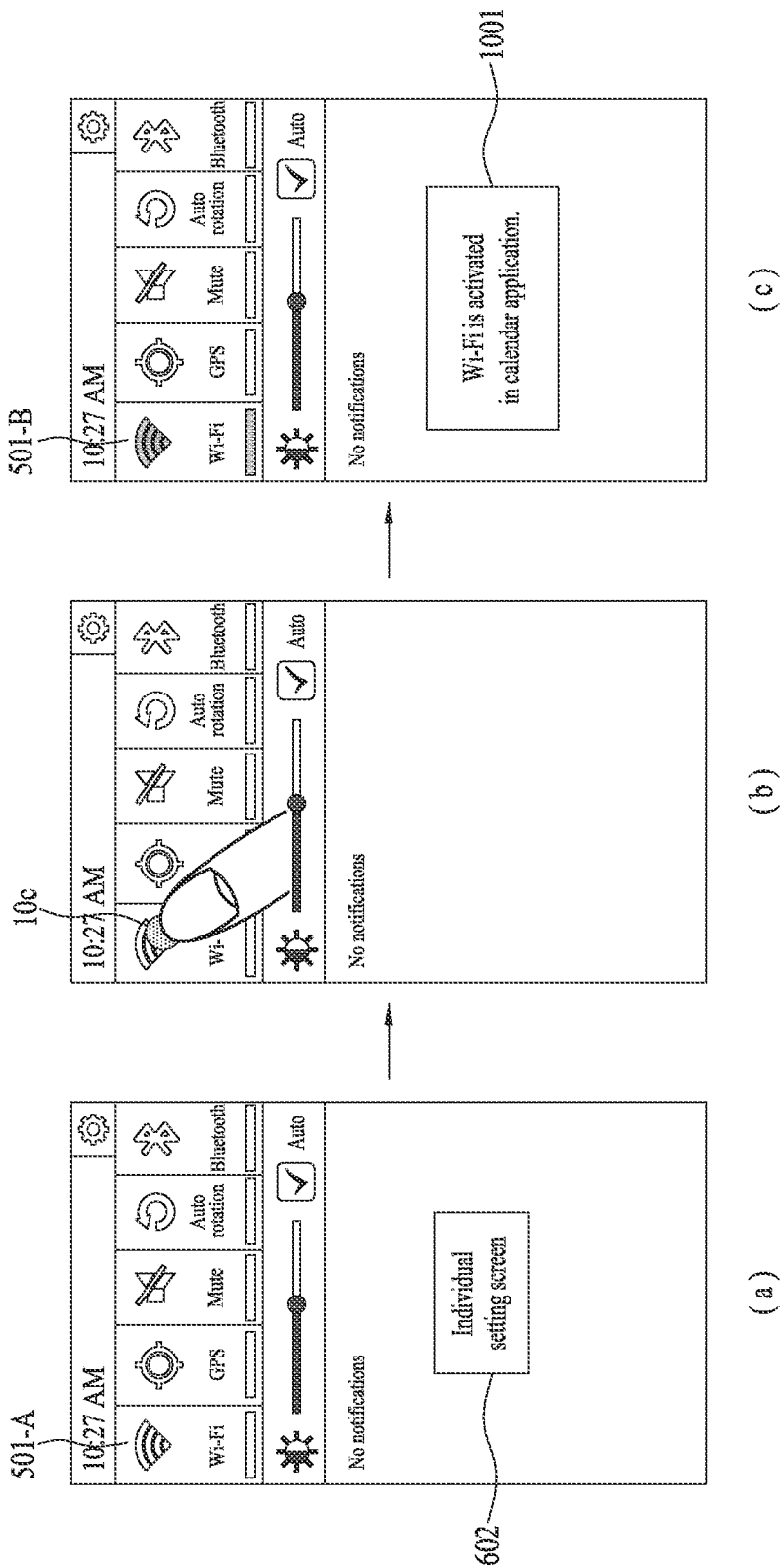

FIG. 10 is a diagram of a status of an individual setting screen according to one embodiment of the present invention. In this case, the individual setting screen can be paged by one of the individual setting screen paging methods described with reference to FIGS. 6 to 8.

Referring to FIG. 10 (a), the controller 180 can output a popup window 602 indicating an individual setting screen. And, at least one or more setting icons 501-A to 505-A) can be outputted from the individual setting screen. In the example shown in FIG. 10 (a), the setting icons are currently inactive.

If a user intends to activate a Wi-Fi function in the settings of a prescribed application, the user can select the currently outputted setting icon 501-A. In particular, if the Wi-Fi setting icon 501-A in the inactive state is selected by an input 10c (i.e., a touch to the setting icon 501-A), the controller 180 can activate the Wi-Fi function [FIG. 10 (b)]. If so, referring to FIG. 10 (c), the controller 180 enables the inactive Wi-Fi setting icon 501-A to enter an active state 501-B and is also able to output a popup window 1001 indicating that the Wi-Fi function is activated in the settings of the prescribed application.

Figure 11:
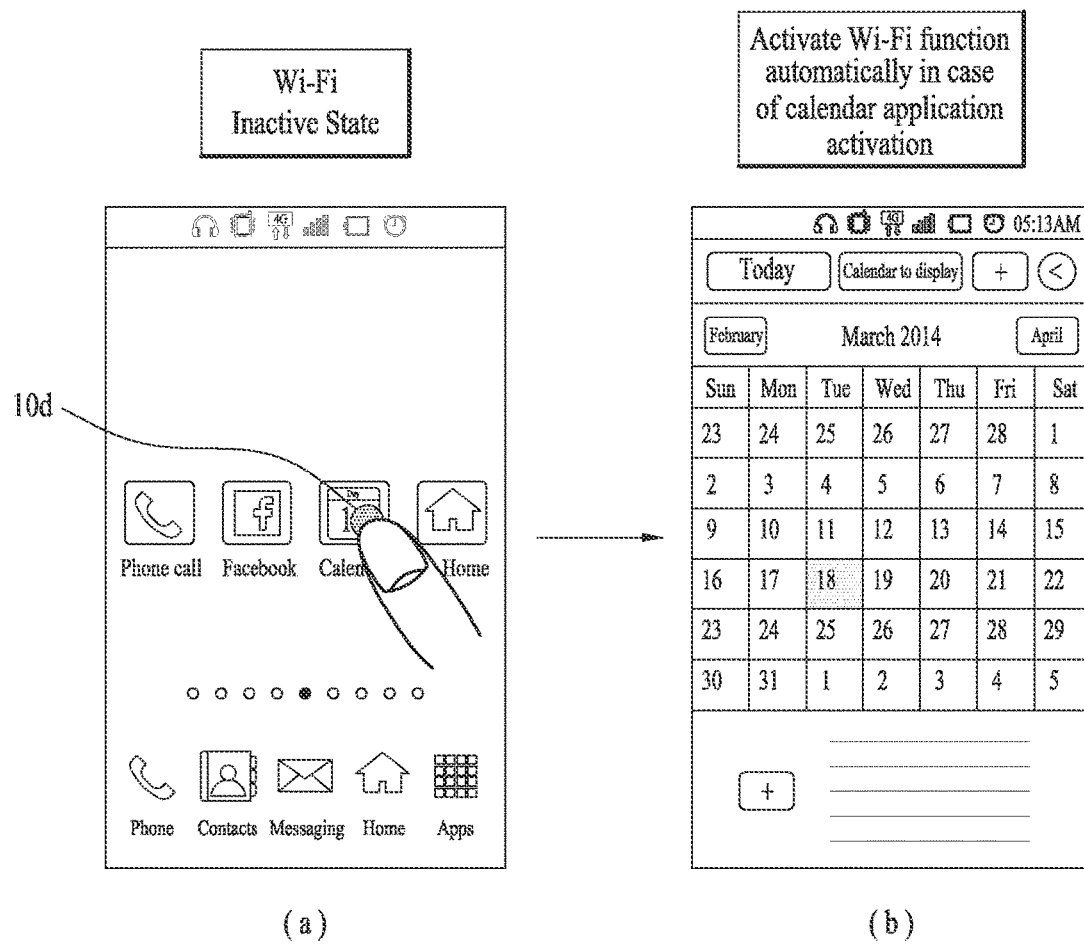
FIG. 11 is a diagram for one example of a method of changing settings automatically in case of activation of a prescribed application according to one embodiment of the present invention.

FIG. 11 is a diagram for one example of a method of changing settings automatically in case of activation of a prescribed application according to one embodiment of the present invention. In the example shown in FIG. 11, a Wi-Fi function is inactive in the settings of an overall system. And, assume that a Wi-Fi function is activated as the individual settings of a calendar application.

Referring to FIG. 11 (a) and FIG. 11 (b), if the controller 180 receives an input 10d (e.g., an input of touching a calendar application icon) for activating the calendar application, the controller 180 outputs an active screen of the calendar application. In doing so, the controller 180 can automatically activate the Wi-Fi function while activating the calendar application. Moreover, if the activation of the calendar application is terminated (or, if a current screen is switched to a home screen or a screen of another application), the controller 180 can automatically return to the overall system settings (i.e., deactivate the Wi-Fi function automatically).

In particular, according to one embodiment of the present invention, the controller 180 can control the individual application settings to have a priority higher than that of the overall system settings. In more particular, in case of a normal use, the controller 180 controls the normal use based on the overall system settings. If the individual settings for a prescribed application exist, the controller 180 can operate in a manner of applying the corresponding individual settings with priority. Therefore, in the example described with reference to FIG. 11, even if the Wi-Fi function is inactive in the overall system settings, the controller 180 prioritizes the individual settings in case of the activation of the calendar application, thereby activating the Wi-Fi function.

(2) Method of Discriminating Setting Screens Using Touch Gestures

Figure 12:
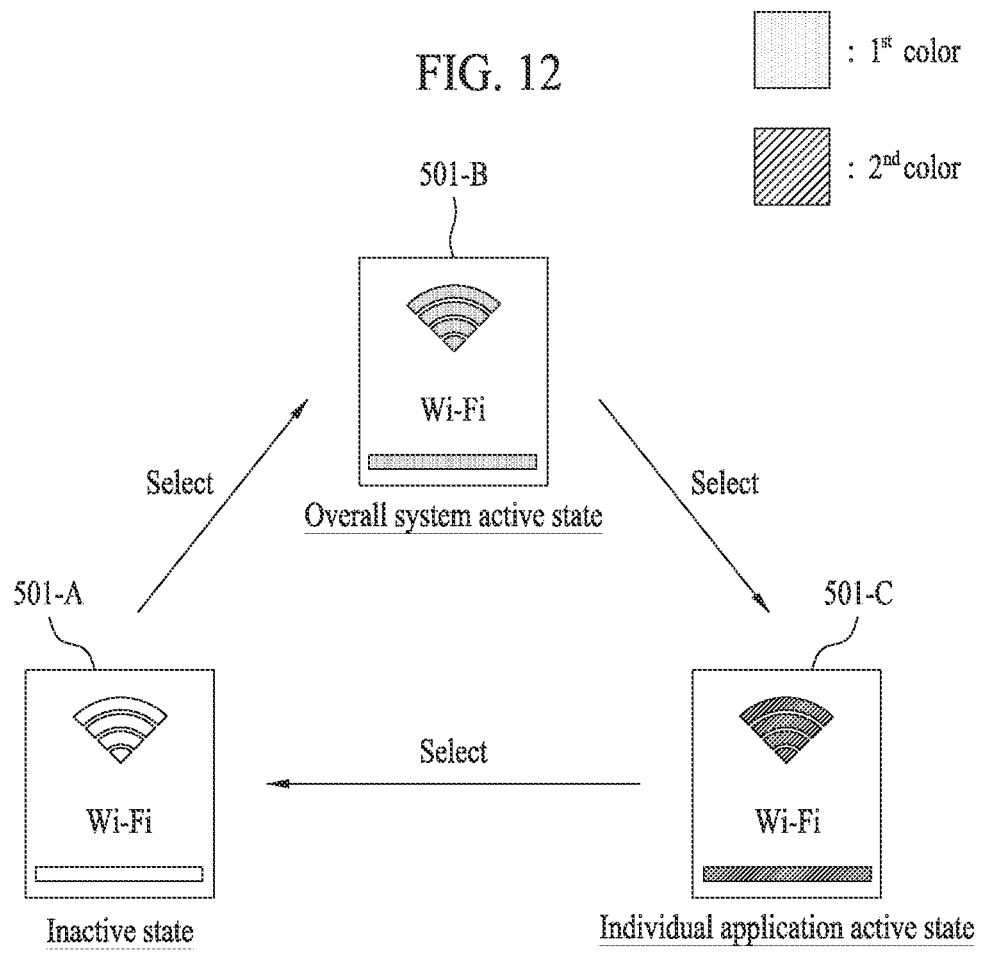
FIG. 12 and FIG. 13 are diagrams for one example of a method of changing a setting icon sequentially in order of deactivation→overall system activation→individual application activation in case of selecting the setting icon consecutively to discriminate an overall system setting and an individual setting from each other according to one embodiment of the present invention.
Figure 13:
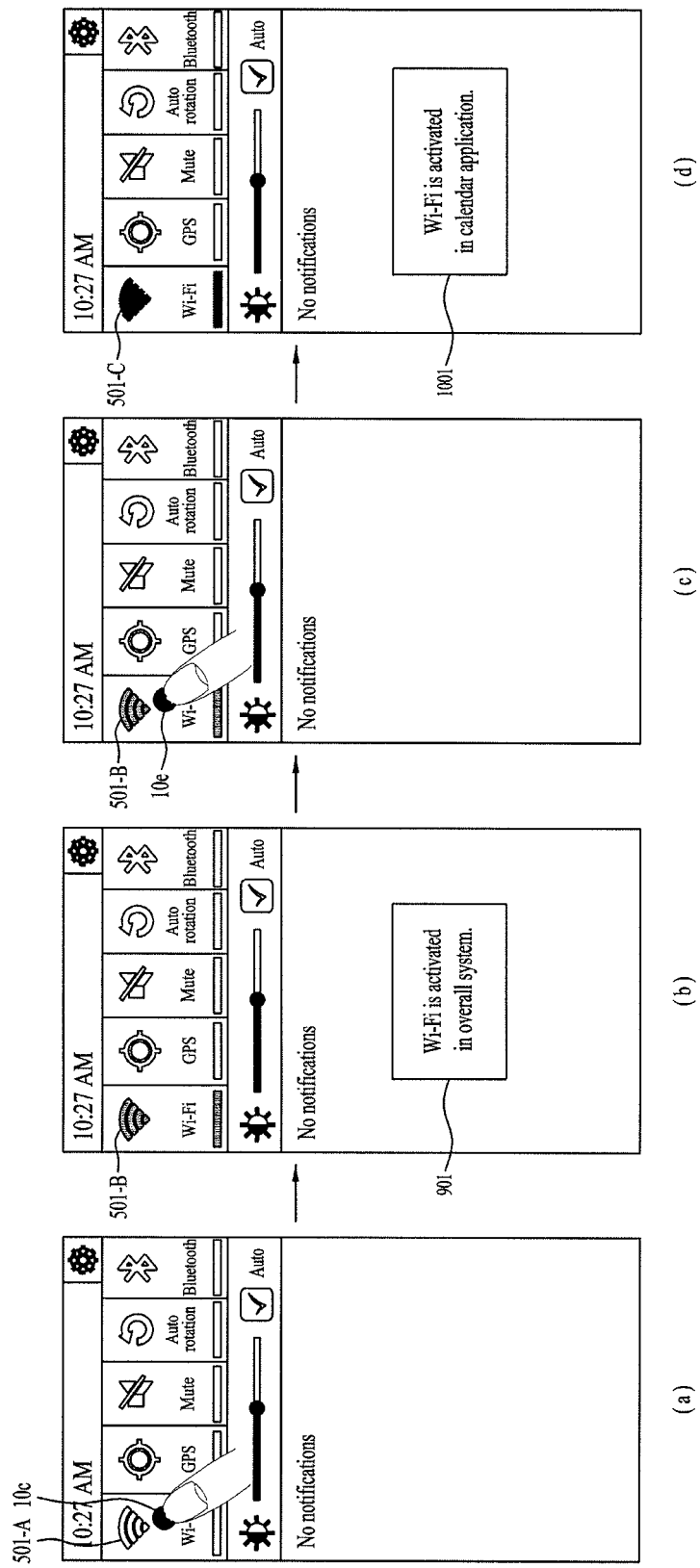

FIG. 12 and FIG. 13 are diagrams for one example of a method of changing a setting icon sequentially in order of deactivation 4 overall system activation individual application activation in case of selecting the setting icon consecutively to discriminate an overall system setting and an individual setting from each other according to one embodiment of the present invention.

FIG. 12 is a diagram for one example of a method of discriminating sequentially changed icon statuses according to one embodiment of the present invention, in which the Wi-Fi setting icons 501-A to 501-C are taken as an example. According to one embodiment of the present invention, it is proposed to further discriminate an overall system activation case and an individual application activation case as well as to discriminate an active state and an inactive state.

If the setting icon 501-A in the inactive state is selected, the controller 180 changes it into the setting icon 501-B in the overall system active state and then outputs the setting icon 501-B. If the setting icon 501-B in the overall system active state is selected, the controller 180 changes it into the setting icon 501-C in the individual application active state and then outputs the setting icon 501-C. Finally, if the setting icon 501-C in the individual application active state is selected, the controller 180 changes it into the setting icon 501-A in the inactive state again and then outputs the setting icon 501-A. Meanwhile, the example of the setting icon changed depending on the state, as shown in FIG. 12, can be identically applicable to a case of discriminating overall system activation and individual application activation according to another embodiment as well as to the sequentially changed case show in FIG. 13.

An embodiment for discriminating an inactive state, an overall system active state and an individual application active state, like FIG. 12, is described in detail with reference to the accompanying drawing as follows.

Referring to FIG. 13 (a), the controller 180 currently outputs a setting screen 404 through the touchscreen 151. And, an inactive Wi-Fi setting icon 501-A is outputted from the setting screen 404. Referring to FIG. 13 (a) and FIG. 13 (b), if an icon 501-A is selected [10c], the controller 180 can activate Wi-Fi function in an overall system in response to the input 10c. Referring to FIG. 13 (b), the controller 180 controls the Wi-Fi setting icon 501-A in the inactive state to enter an overall system active state 501-B and is also able to output a popup window 901 indicating that the Wi-Fi function is activated in the overall system.

Subsequently, referring to FIG. 13 (c) and FIG. 13 (d), if an icon 501-B is selected [10e], the controller 180 can activate Wi-Fi function in an individual application (e.g., a calendar application in the example shown in FIG. 13) in response to the input 10e. Referring to FIG. 13 (d), the controller 180 controls the Wi-Fi setting icon 501-B in the active state to enter an active state 501-B and is also able to output a popup window 901 indicating that the Wi-Fi function is activated in the overall system.

Figure 14:
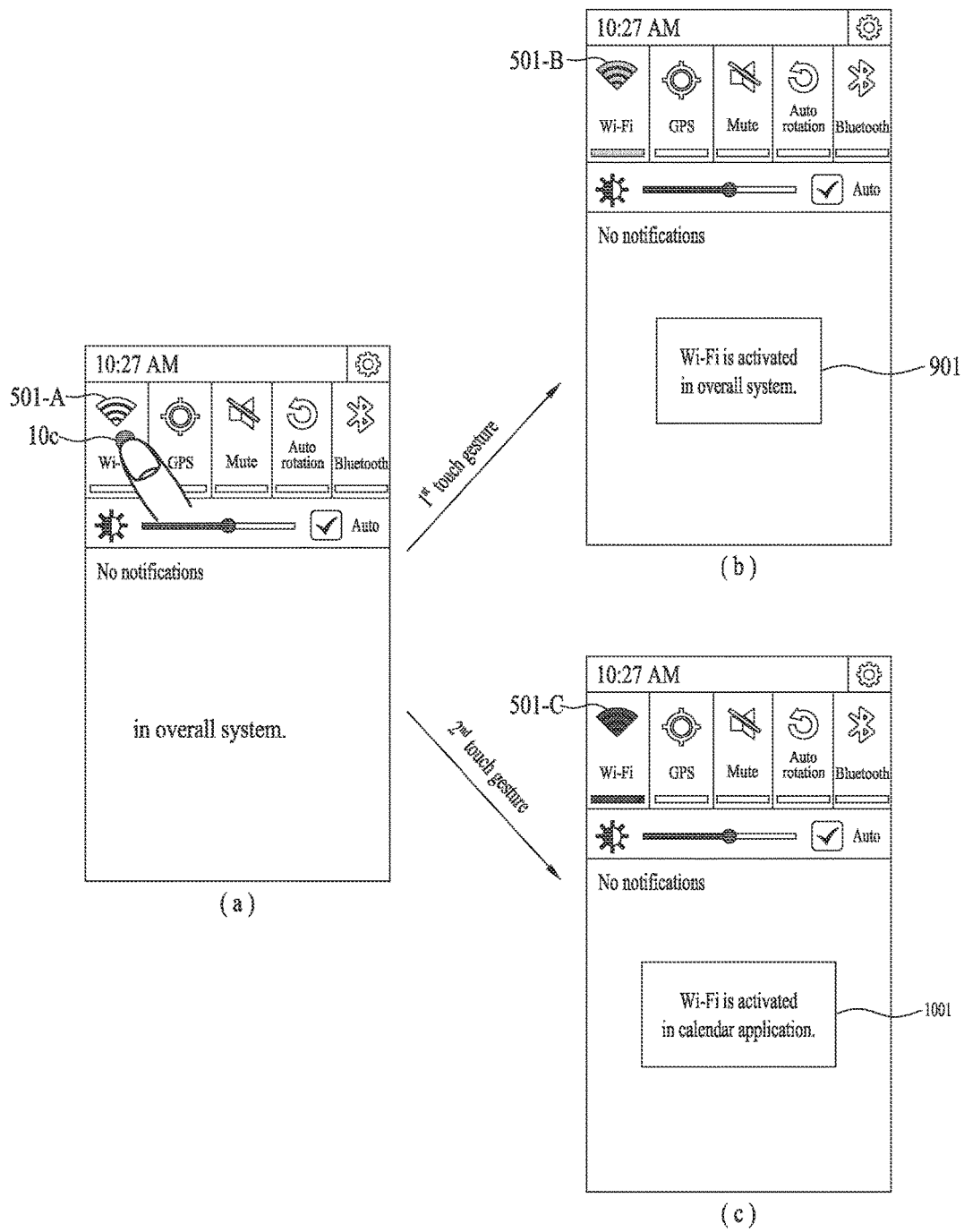
FIG. 14 is a diagram for one example of a method of discriminating a common setting and an individual setting from each other using touch gestures according to one embodiment of the present invention.

FIG. 14 is a diagram for one example of a method of discriminating a common setting and an individual setting from each other using touch gestures according to one embodiment of the present invention.

Referring to FIG. 14 (a), a setting screen 404 is currently outputted. And, an overall system setting and an individual application setting can be discriminated depending on a $1^{st}$ touch gesture and a $2^{nd}$ touch gesture, respectively.

If a $1^{st}$ touch gesture is applied to a Wi-Fi setting icon 501-A, the controller 180 can control a Wi-Fi function to be activated in an overall system. In doing so, the controller 180 changes the setting icon 501-A into a setting icon 501-B and is also able to output a popup window 901 indicating that the Wi-Fi function is activated in the overall system.

If a $2^{nd}$ touch gesture is applied to the Wi-Fi setting icon 501-A, the controller 180 can control a Wi-Fi function to be activated in an individual application. In doing so, the controller 180 changes the setting icon 501-A into a setting icon 501-C and is also able to output a popup window 901 indicating that the Wi-Fi function is activated in the individual application.

For instance, the $1^{st}$ touch gesture may include a touch input to the setting icon 501-A and the $2^{nd}$ touch gesture may include a press input to the setting icon 501-A, by which touch gestures of the present invention may be non-limited.

Figure 15:
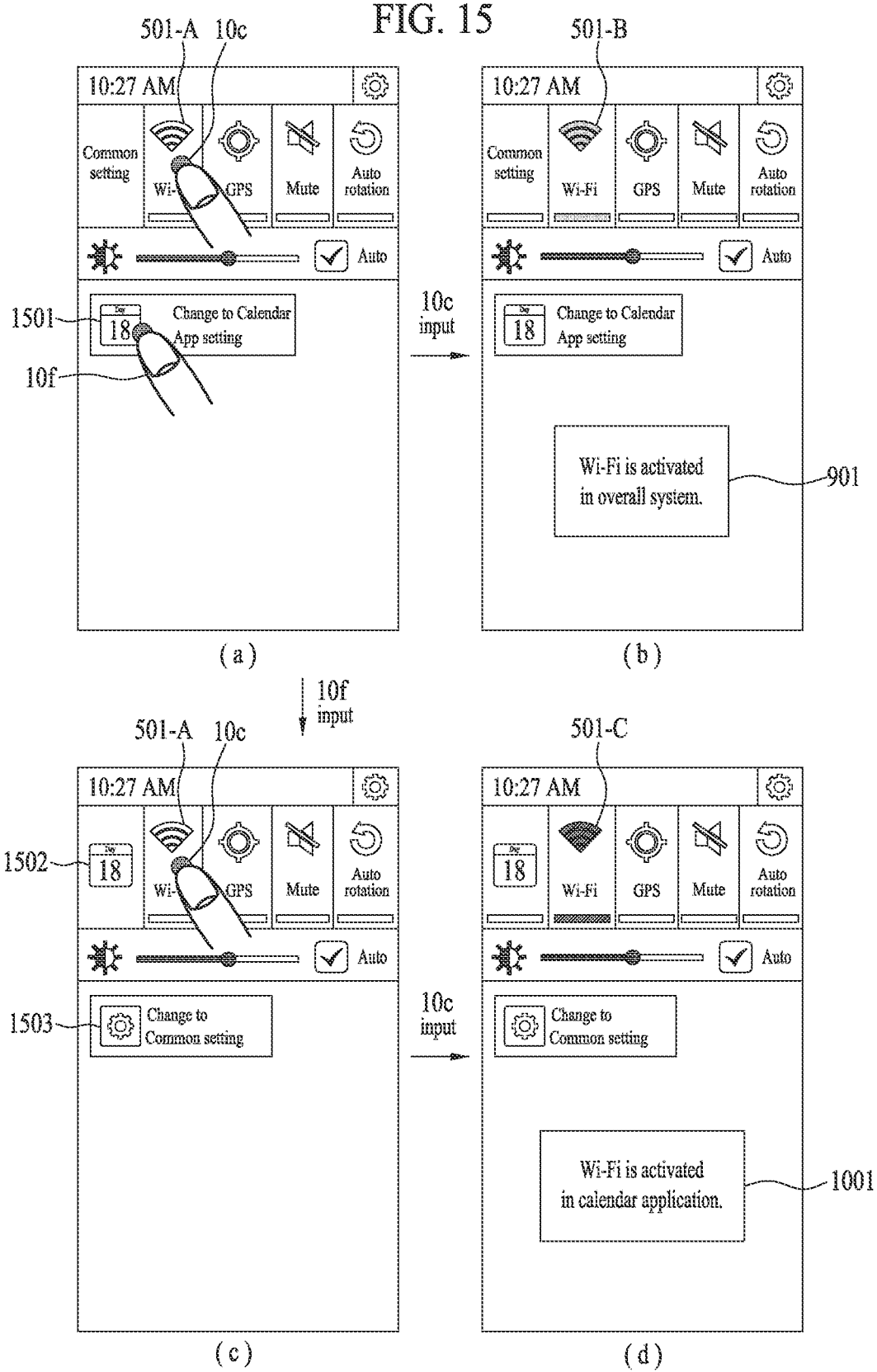
FIG. 15 is a diagram for one example of a method of discriminating a common setting and an individual setting from each other using a switching icon according to one embodiment of the present invention.

FIG. 15 is a diagram for one example of a method of discriminating a common setting and an individual setting from each other using a switching icon according to one embodiment of the present invention.

Referring to FIG. 15 (a), the controller 180 currently outputs a common setting screen and a switching icon 1501 for switching to an individual setting screen. If the controller 180 receives a setting change input 10c in the common setting screen shown in FIG. 15 (a), the controller 180 can control a setting for an overall system to be changed. For instance, the controller 180 can activate a Wi-Fi function for the overall system in response to an input 10c of selecting a setting icon 501-A. Subsequently, referring to FIG. 15 (b), the controller 180 changes the setting icon 501-A into a setting icon 501-B and is also able to output a popup window 901 indicating that the Wi-Fi function is activated in the overall system.

If the switching icon 1501 for switching to the individual setting screen is selected [10f], the controller 180 can switch the common setting screen to the individual setting screen [FIG. 15 (c)]. In this case, the input 10f may include an input of touching the switching icon 1501 for switching to the individual setting screen.

Referring to FIG. 15 (c), the controller 180 can output the individual setting screen and an indicator 1502 for identifying a prescribed application.

The controller 180 can output a switching icon 1503 for switching to the common setting screen again together with the outputted individual setting screen. In particular, if the switching icon 1503 is selected, the controller 180 can switch back to the common setting screen shown in FIG. 15 (a).

Likewise, if the controller 180 receives an input 10c of selecting the setting icon 501-A in the individual setting screen shown in FIG. 15 (c), the controller 180 can control a Wi-Fi function to be activated for the prescribed application. Subsequently, the controller 180 changes the setting icon 501-A into a setting icon 501-C and is also able to output a popup window 1001 indicating that the Wi-Fi function is activated in the settings of the prescribed application.

(3) Method of Outputting Setting Icons Discriminately from a Setting Screen

FIG. 16 is a diagram for one example of a method of outputting a setting icon discriminately to discriminate a common setting and an individual setting from each other according to one embodiment of the present invention.

Referring to FIG. 16, according to one embodiment of the present invention, the controller 180 can output at least one setting icon for a common setting [cf. a region 1601] and at least one setting icon [cf. regions 1602 to 1605] for an individual setting for each application.

The at least one setting icon (i.e., the setting icons included in the region 1601) for the common setting can control activation/deactivation of a prescribed function of an overall system in case of a manipulation on the corresponding setting icon.

The setting icons (i.e., the setting icons included in the regions 1602 to 1605) for the individual setting can activations/deactivations of prescribed functions for a corresponding application, respectively. For instance, if a Bluetooth setting icon 505-A is selected from the setting icons in the region 1606, the controller 180 can activate a Bluetooth function as an individual setting for an application 'Facebook'. In particular, if the application 'Facebook' is activated, the controller 180 can control the Bluetooth function to be activated.

So far, the basic methods for operating in a manner of discriminating a common setting and an individual setting are described. Each of the above methods can be applied independently. Alternatively, at least two of the above methods can be used by being combined with each other. For instance, in a method of outputting each of a common setting screen and an individual setting screen separately, a common setting and an individual setting can be discriminated through touch gestures. This is described in detail with reference to FIG. 17 as follows.

FIG. 17 is a diagram for one example of an operating method by combining two kinds of controlling methods according to one embodiment of the present invention.

Referring to FIG. 17, the controller 180 currently outputs an individual setting screen. As mentioned in the foregoing description, the individual setting screen means a setting screen for enabling settings to be applied in case of activation of a prescribed application only. According to one embodiment of the present invention, proposed is a controlling method by discriminating an individual setting and a common setting through touch gestures despite an individual setting screen.

In particular, the controller 180 basically handles a setting manipulation input, which is applied to the individual setting screen, as an individual setting input. If the setting manipulation input is applied through a prescribed touch gesture 10g, the controller 180 can handle it as a common setting input. For instance, if the controller 180 receives an input of touching a Wi-Fi setting icon 501-A in the individual setting screen, the controller 180 can handle the received input as an individual setting. Yet, if the controller 180 receives an input of pressing the Wi-Fi setting icon 501-A, the controller 180 can handle the received input as a common setting.

If a common setting input is received in the individual setting screen, the controller 180 can output a popup window 1701 for checking whether the common setting is correct. Moreover, according to one embodiment of the present invention, if a button 'Yes' 1701a is selected from the popup window 1701, the received input is handled as the common setting. If a button 'No' 1701b is selected from the popup window 1701, the received input is handled as the individual setting.

Meanwhile, according to one embodiment of the present invention, when a setting screen is paged on an output screen of an active screen of a prescribed application, it is proposed that the active screen is outputted differently depending on a property of the prescribed application. Such an embodiment shall be described in detail with reference to FIG. 18A and FIG. 18B as follows.

Figure 18B:
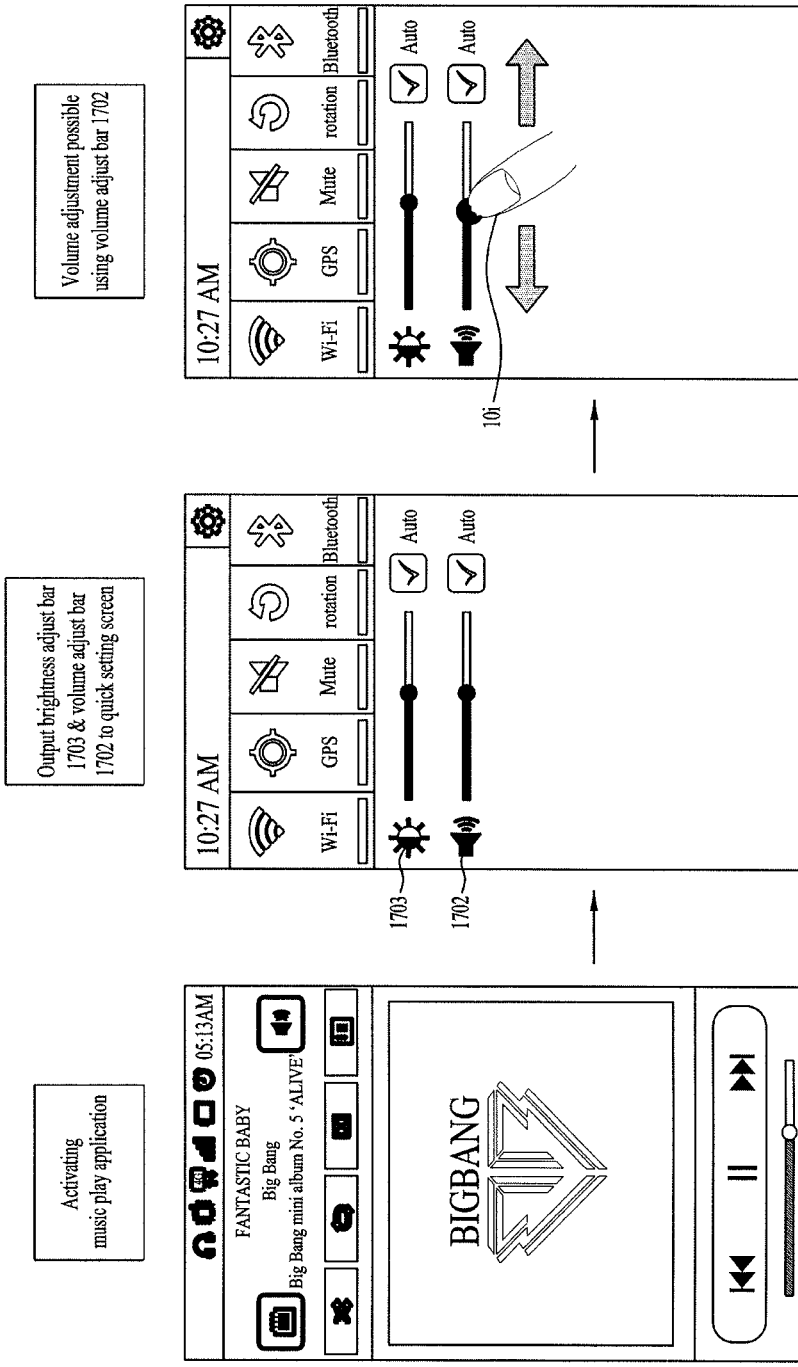

FIG. 18A and FIG. 18B are diagrams for one example of a method of changing a setting screen depending on a type (or property) of an active application according to one embodiment of the present invention.

FIG. 18A (a) shows that an active screen of an e-book application is currently outputted. FIG. 18B (a) shows that an active screen of a music play application is currently outputted.

In activation of the e-book application, a screen control may be prioritized rather than a volume control. On the contrary, in activation of the music play application, a volume control may be prioritized rather than a screen control. Therefore, according to one embodiment of the present invention, it is proposed that an outputted setting screen is changed depending on a property of the changed application.

Referring to FIG. 18A (b), if a setting screen is outputted from an active screen of the e-book application, the controller 180 can output a brightness adjust bar 1703 for adjusting a screen brightness instead of an object for adjusting a volume. Referring to FIG. 18A (c), by controlling an adjust object on the brightness adjust bar 1703 [10h], it is able to control a brightness of a screen outputted from the touchscreen 151 to be raised or lowered.

Referring to FIG. 18B (b), when a setting screen is outputted from an active screen of the music play application, the controller 180 can output a volume adjust bar for adjusting a volume and a brightness adjust bar 1703 for adjusting a screen brightness together. Referring to FIG. 18B (c), by controlling an adjust object on the volume adjust bar 1702 [10i], it is able to control an output of the audio output module 152 to be raised or lowered.

According to the above-described embodiment, since an individual setting screen of a corresponding application is outputted in case of performing an individual setting, it may be inconvenient to perform a setting on each application individually. Therefore, according to one embodiment of the present invention, proposed is a method of controlling individual settings collectively. Such a method shall be described in detail with reference to FIG. 19 as follows.

FIG. 19 is a diagram for one example of a method of controlling individual settings for a plurality of applications according to one embodiment of the present invention.

Referring to FIG. 19 (a), an individual setting screen is displayed. And, a plurality of application icons 1901 to 1908 are currently outputted from the individual setting screen.

According to one embodiment of the present invention, at least one of a plurality of application icons 1901* to 1908* is selected. When a setting manipulation input is applied, the applied input is controlled to be applied to the application(s) corresponding to the selected at least one application icon.

Referring to FIGS. 19 (a) to 19 (c), the controller 180 can output applications in a manner of discriminating a selection application icon and an unselected application icon from each other. For instance, the selected application icon(s) may be displayed relatively bright, while the unselected application icon(s) may be displayed relatively dark. And, each of the selected application icons shown in FIGS. 19 (a) to 19 (c) is indicated by being denoted by a mark '*' next to a corresponding reference number.

According to one embodiment of the present invention, if the controller 180 receives an input of selecting a prescribed application icon, the controller 180 can control the selected application icon to enter 'selected' or 'unselected' switchably. For instance, if the controller 180 receives an input of applying a touch 10j to an unselected application 'Facebook' icon 1905 [FIG. 19 (a)], the controller 180 controls the corresponding application 'Facebook' icon 1905 to enter a selected state 1905* and is able to control the selected application 'Facebook' icon 1905 to be identifiably displayed in a manner of being brightened [FIG. 19 (b)].

While the prescribed application icons 1901*, 1905* and 1908* are selected, if the controller 180 receives a setting manipulation input 10k, the controller 180 can control individual settings for the selected application icons 1901*, 1905* and 1908* to be changed. If the controller 180 receives an input of selecting the GPS setting icon 502-A, as shown in FIG. 19 (b), the controller can activate the GPS function to be activated as the individual settings for the selected application icons 1901*, 1905* and 1908*. Moreover, according to one embodiment of the present invention, the controller 180 can output a popup window 1909 indicating that the individual settings for the selected application icons are complete.

Figure 20:
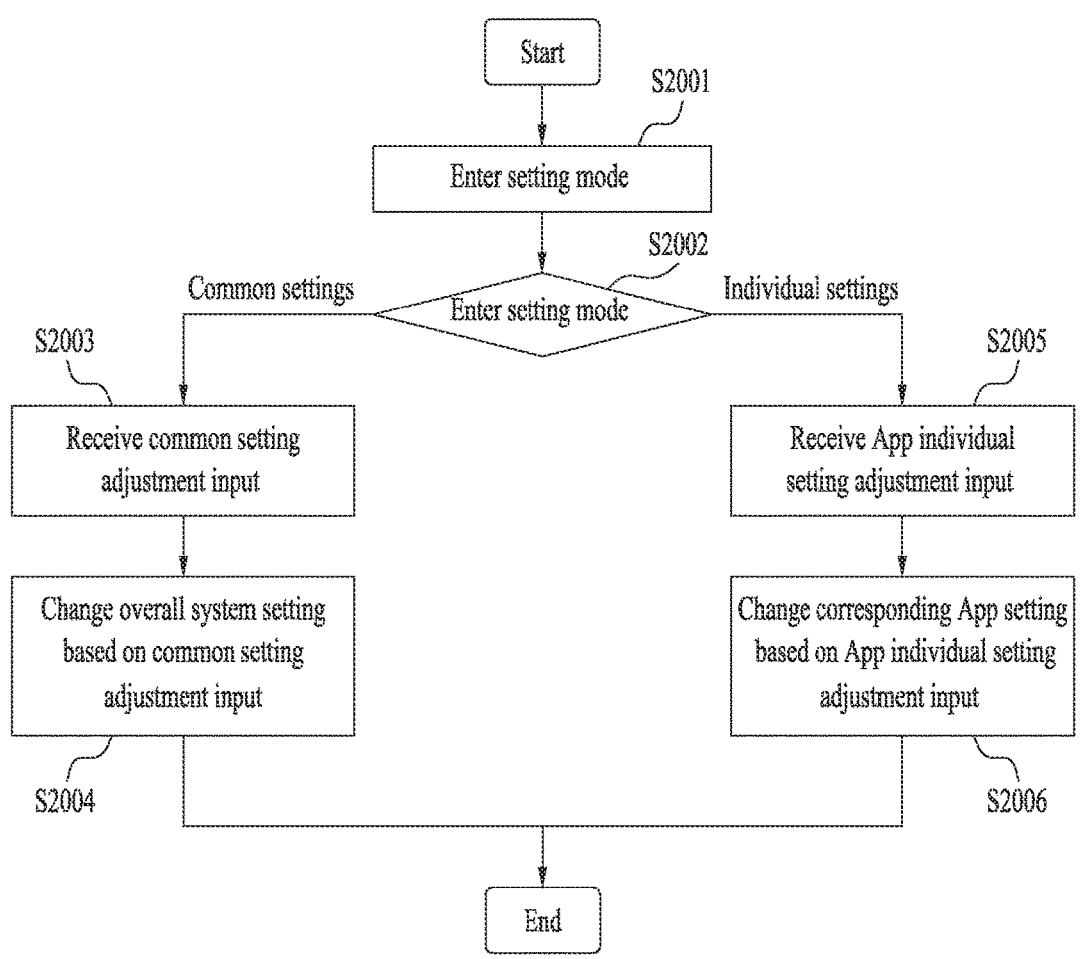
FIG. 20 is a flowchart according to one embodiment of the present invention.

FIG. 20 is a flowchart according to one embodiment of the present invention.

Referring to FIG. 20, in a step S2001, the controller 180 enters a setting mode. In a step S2002, the controller 180 can select the setting mode. As mentioned in the foregoing description, the selection of the setting mode can be performed through one of: (1) whether a setting screen is a common setting screen or an individual setting screen [FIGS. 6 to 8]; (2) a discrimination by a user's touch gesture [FIGS. 13 to 15]; and (3) a discrimination between a setting icon for a common setting and a setting icon for an individual setting [FIG. 16]. In case of a common setting mode, the controller 180 goes to a step S2003. In case of an individual setting mode, the controller 180 goes to a step S2005.

In the step S2003, the controller 180 receives an input of adjusting a common setting. In a step S2004, the controller 180 can change a setting for an overall system in response to the received common setting adjustment input.

In the step S2005, the controller 180 receives an application individual setting adjustment input. In a step S2006, the controller 180 can change an individual setting based on the received application individual setting adjustment input.

Accordingly, embodiments of the present invention provide various effects and/or features.

According to at least one of embodiments of the present invention, a setting for an overall system and a setting for an individual application are performed discriminately, whereby a convenience enhanced user environment can be provided.

According to at least one of embodiments of the present invention, in performing a setting for an overall system and a setting for an individual application discriminately, a user interface (UI) for facilitating the settings can be provided.

It will be appreciated by those skilled in the art that the present invention can be specified into other form(s) without departing from the spirit or scope of the inventions.

The above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a touchscreen; and
a controller configured to:
display, via the touchscreen, a system setting screen including at least one setting icon, in response to a first touch gesture, and to display a plurality of applications, in response to receiving selecting input of a first setting icon in an inactive state, via the touchscreen, change the first setting icon into a second setting icon in an overall system active state, and display the second setting icon, wherein in the inactive state, the first setting icon is not activated, and in the overall system active state, the first setting icon is active for all of the plurality of applications, in response to receiving selecting input of the second setting icon in the overall system active state, via the touchscreen, change the second setting icon into a third setting icon in an individual application active state, and display the third setting icon, wherein in the individual application active state, the setting icon is active only for a prescribed individual application, in response to receiving selecting input of the third setting icon in the individual application active state, via the touch screen, change the third setting icon into the first setting icon in the inactive state again, and display the first setting icon, wherein, if receiving an application individual setting input corresponding to the prescribed individual application, via the touchscreen, control the application individual setting to be applied in case of activation of the prescribed application only, display an overall setting screen, in response to receiving selecting input of a setting icon, activate a function corresponding to the setting icon in an overall system, display a first popup window indicating that the function is activated in the overall system, display an individual setting screen and a specific indicator identifying an individual application, in response to receiving selecting input of a setting icon, activate a function corresponding to the setting icon in the individual application, and display a second popup window indicating that the function is activated in the individual application, wherein the at least one setting icon corresponds to a setting for the overall system and a setting for the prescribed individual application, wherein the at least one setting icon is one of a Wi-Fi setting icon, a Global Positioning System (GPS) setting icon, a sound setting icon, an auto-rotation setting icon, a Bluetooth setting icon, a data network setting icon and a power saving mode setting icon, wherein the first touch gesture comprises an input applied in a manner of touching a first side edge in a first region generated from partitioning the touchscreen into two parts and then dragging, and wherein a second touch gesture comprises one of:
an input applied in a manner of touching the first side edge in a second region generated from partitioning the touchscreen into the two parts of the touchscreen and then dragging; and
an input applied in a manner of two sequential taps of one finger over a duration of time touching the first side edge of the touchscreen and then dragging.

2. The mobile terminal of claim 1, wherein the controller is further configured to control the system setting based on the received application individual setting input if the prescribed application is executed.

3. A method of controlling a mobile terminal, comprising:
displaying, via the touchscreen, a system setting screen including at least one setting icon, in response to a first touch gesture, and displaying a plurality of applications;

in response to receiving selecting input of a first setting icon in an inactive state, via the touchscreen, changing the first setting icon into a second setting icon in an overall system active state, and displaying the second setting icon, wherein in the inactive state, the first setting icon is not activated, and in the overall system active state, the first setting icon is active for all of the plurality of applications;

in response to receiving selecting input of the second setting icon in the overall system active state, via the touchscreen, changing the second setting icon into a third setting icon in an individual application active state, and displaying the third setting icon, wherein in the individual application active state, the setting icon is active only for a prescribed individual application;

in response to receiving selecting input of the third setting icon in the individual application active state, via the touch screen, changing the third setting icon into the first setting icon in the inactive state again, and displaying the first setting icon;

if receiving an application individual setting input corresponding to the prescribed individual application, via the touchscreen, controlling the application individual setting to be applied in case of activation of the prescribed application only;

displaying an overall setting screen;

in response to receiving selecting input of a setting icon, activating a function corresponding to the setting icon in an overall system;

displaying a first popup window indicating that the function is activated in the overall system;

displaying an individual setting screen and a specific indicator identifying an individual application;

in response to receiving selecting input of a setting icon, activating a function corresponding to the setting icon in the individual application; and displaying a second popup window indicating that the function is activated in the individual application, wherein the at least one setting icon corresponds to a setting for the overall system and a setting for the prescribed individual application, wherein the at least one setting icon is one of a Wi-Fi setting icon, a Global Positioning System (GPS) setting icon, a sound setting icon, an auto-rotation setting icon, a Bluetooth setting icon, a data network setting icon and a power saving mode setting icon, wherein the first touch gesture comprises an input applied in a manner of touching a first side edge in a first region generated from partitioning the touchscreen into two parts and then dragging, and wherein a second touch gesture comprises one of:
an input applied in a manner of touching the first side edge in a second region generated from partitioning the touchscreen into the two parts of the touchscreen and then dragging; and
an input applied in a manner of two sequential taps of one finger over a duration of time touching the first side edge of the touchscreen and then dragging.

4. The method of claim 3, further comprising controlling the system setting based on the received application individual setting input in case of the activation of the prescribed application.

* * * * *